(12) United States Patent (10) Patent No.: US 12,568,232 B2
Browne et al. (45) Date of Patent: Mar. 3, 2026

(54) DATA ENCODING AND DECODING

(71) Applicant: Sony Group Corporation, Tokyo (JP)

(72) Inventors: Adrian Richard Browne, Basingstoke (GB); Stephen Mark Keating, Basingstoke (GB); Karl James Sharman, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 106 days.

(21) Appl. No.: 18/573,702

(22) PCT Filed: Jun. 20, 2022

(86) PCT No.: PCT/GB2022/051567
§ 371 (c)(1),
(2) Date: Dec. 22, 2023

(87) PCT Pub. No.: WO2023/275512
PCT Pub. Date: Jan. 5, 2023

(65) Prior Publication Data
US 2024/0305796 A1 Sep. 12, 2024

(30) Foreign Application Priority Data
Jun. 30, 2021 (GB) ..................................... 2109461

(51) Int. Cl.
*H04N 19/196* (2014.01)
*H04N 19/136* (2014.01)
(52) U.S. Cl.
CPC ......... *H04N 19/196* (2014.11); *H04N 19/136* (2014.11)

(58) Field of Classification Search
CPC ........................... H04N 19/196; H04N 19/136
See application file for complete search history.

(56) References Cited

U.S. PATENT DOCUMENTS 6,067,295 A * 5/2000 Bahai ................... H04B 7/0845
375/348
8,325,807 B2 12/2012 Nilsson et al.
(Continued)

FOREIGN PATENT DOCUMENTS

CN 110545430 * 5/2018
CN 110679148 * 7/2018
(Continued)

OTHER PUBLICATIONS

Zhao, Juanping translation of WO 2022206166 Jan. 28, 2022 (Year: 2022).*
(Continued)

*Primary Examiner* — Zaihan Jiang
(74) *Attorney, Agent, or Firm* — XSENSUS LLP

(57) ABSTRACT
A data encoding method comprises generating one or more encoding parameters; communicating the one or more encoding parameters for use by a decoding process; and encoding data items representing image data samples of an image by generating residual data indicative of a difference between an image data sample and a predicted version of that image data sample, the encoding step performing the encoding in dependence upon the one or more encoding parameters generated by the generating step; in which the generating step comprises deriving an estimate of the residual data in respect of at least a subset of the image data samples and generating the one or more encoding parameters in dependence upon the derived estimate.

18 Claims, 17 Drawing Sheets

(56) References Cited

U.S. PATENT DOCUMENTS

| | | | | |
|---|---|---|---|---|
| 10,769,442 B1 * | 9/2020 | Ding | .................... | G06T 7/254 |
| 11,095,923 B1 * | 8/2021 | Shams | ............... | H04N 21/2668 |
| 11,166,051 B1 * | 11/2021 | Shams | ................... | H04N 21/44 |
| 2007/0286508 A1 * | 12/2007 | Le Leannec | ........... | H04N 19/36 |
| | | | | 375/E7.176 |
| 2008/0025399 A1 * | 1/2008 | Le Leannec | ......... | H04N 19/105 |
| | | | | 375/E7.173 |
| 2008/0273596 A1 * | 11/2008 | Oguz | ............... | H04N 21/44016 |
| | | | | 375/E7.023 |

FOREIGN PATENT DOCUMENTS

| | | | |
|---|---|---|---|
| CN | 109151482 | * | 10/2018 |
| DE | 60106702 | * | 8/2001 |
| EP | 3355579 | * | 11/2016 |
| WO | WO-2012061258 | * | 10/2011 |
| WO | 2012/061258 A2 | | 5/2012 |
| WO | 2021/255443 A1 | | 12/2021 |
| WO | WO-2022206166 | * | 1/2022 |

OTHER PUBLICATIONS

Young, Joseph translation of CN 110679148 Jul. 16, 2018 (Year: 2018).*

Liu, Kai translation of CN 109151482 Oct. 29, 2018 (Year: 2018).*

Takahashi Yuji translation of DE 60106702 Aug. 28, 2001 (Year: 2001).*

Zhou, Tian-yang translation of CN 110545430 May 28, 2018 (Year: 2018).*

Vivienne Sze et al., "High Efficiency Video Coding (HEVC): algorithms and Architecture", Chapter 3, Integrated Circuits and Systems, DOI10.1007/978-3-319-06895-4_3, Switzerland 2014.

Series H: Audiovisual and Multimedia Systems Infrastructure of audiovisual services—Coding of moving video, "High efficiency video coding", Recommendation ITU-T, H.265, Dec. 2016.

International Search Report and Written Opinion mailed on Dec. 15, 2022, received for PCT Application PCT/GB2022/051567, filed on Jun. 20, 2022, 29 pages.

Bross et al., "Versatile Video Coding (Draft 10)", Joint Video Experts Team (JVET) of ITU-T SG 16 WP 3 and ISO/IEC JTC 1/SC 29/WG 11, JVET-S2001-vH, Jun. 22-Jul. 1, 2020, pp. 1-502.

Browne et al., "AHG12: Rice parameter selection for high bit depths", Joint Video Experts Team (JVET) of ITU-T SG 16 WP 3 and ISO/IEC JTC 1/SC 29, JVET-T0072, Oct. 7-16, 2020, 15 pages.

Chen et al., "Algorithm description for Versatile Video Coding and Test Model 12 (VTM 12)", Joint Video Experts Team (JVET) of ITU-T SG 16 WP 3 and ISO/IEC JTC 1/SC 29, JVET-U2002-v1, Jan. 6-15, 2021, 101 pages.

Jhu et al., "AHG12: Slice based Rice parameter selection for transform skip residual coding", Joint Video Experts Team (JVET) of ITU-T SG 16 WP 3 and ISO/IEC JTC 1/SC 29, JVET-T0089, Version-2, Oct. 7-16, 2020, 3 pages.

Jhu et al., "AHG12: Slice based Rice parameter selection for transform skip residual coding", Joint Video Experts Team (JVET) of ITU-T SG 16 WP 3 and ISO/IEC JTC 1/SC 29, JVET-T0089, Oct. 7-16, 2020, 3 pages.

Jhu et al., "CE-2.1: Slice based Rice parameter selection for transform skip residual coding", Joint Video Experts Team (JVET) of ITU-T SG 16 WP 3 and ISO/IEC JTC 1/SC 29, JVET-V0054-r1, Apr. 20-28, 2021, 6 pages.

Sole et al., "Transform Coefficient Coding in HEVC", IEEE Transactions on Circuits and Systems for Video Technology, IEEE, vol. 22, No. 12, Dec. 2012, pp. 1765-1777.

Sharman et al., "AHG 5 and 18: Entropy Coding Compression Efficiency for High Bit Depths", Joint Collaborative Team on Video Coding (JCT-VC) of ITU-T SG 16 WP 3 and ISO/IEC JTC 1/SC 29/WG 11, JCTVC-N0189, Jul. 25-Aug. 2, 2013, pp. 1-14.

Wang et al., "CE-1.1: coding of last significant coefficient position for high bit depth and high bit rate extensions", Joint Video Experts Team (JVET) of ITU-T SG 16 WP 3 and ISO/IEC JTC 1/SC 29, JVET-W0046, Jul. 7-16, 2021, 7 pages.

Wang et al., "AHG8: on coding of last significant coefficient position for high bit depth and high bit rate extensions", Joint Video Experts Team (JVET) of ITU-T SG 16 WP 3 and ISO/IEC JTC 1/SC 29, JVET-V0121-v1, Apr. 20-28, 2021, pp. 1-4.

* cited by examiner

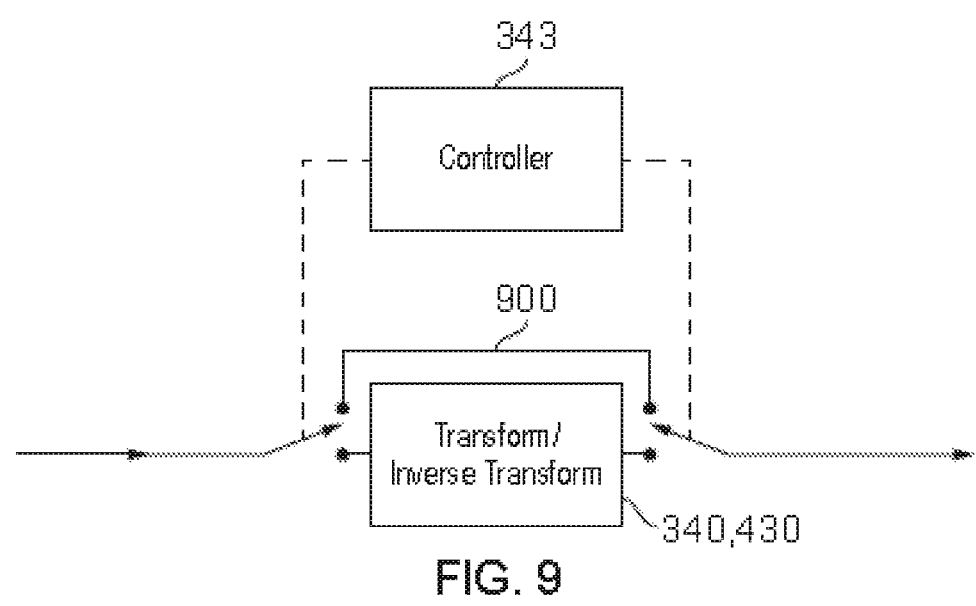
FIG. 9
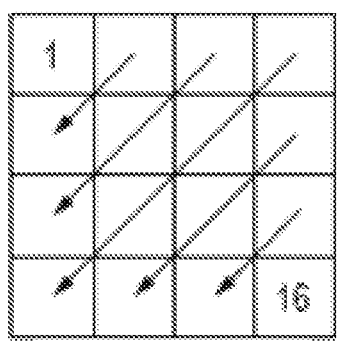
TS
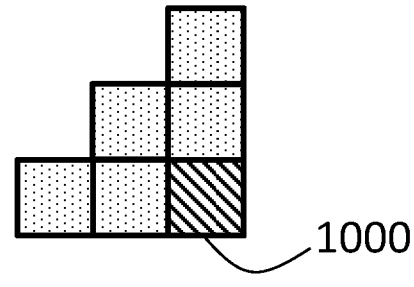
1000
FIG. 10a
FIG. 10b
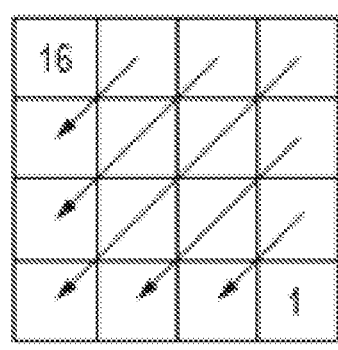
Non-TS
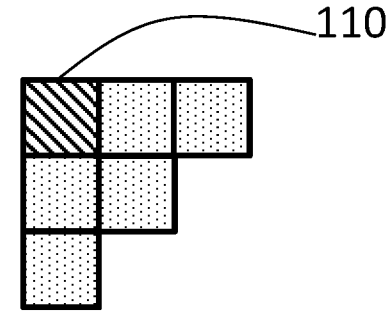
1100
FIG. 11a
FIG. 11b Significance test shifted left by n bits MSBs LSBs 1500 — Code significance flag based on $2^n$ 1510 — Code GT1 flag 1520 — Code parity flag 1530 — Code GT2 flag 1540 — Code escape values 1550 — Code "insignificant values"

1600 — Code significance flag based on $2^n$

1610 — Code escape values

1620 — Code "insignificant values"

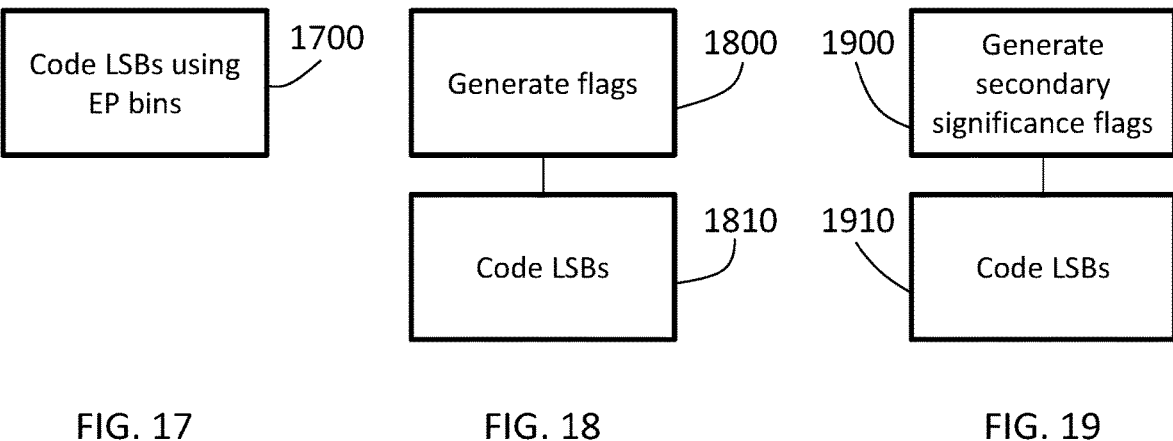
FIG. 17                FIG. 18                FIG. 19
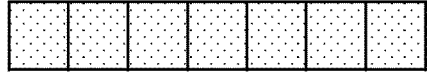
FIG. 20
Secondary significance 2 (or m) bits to right of initial significance
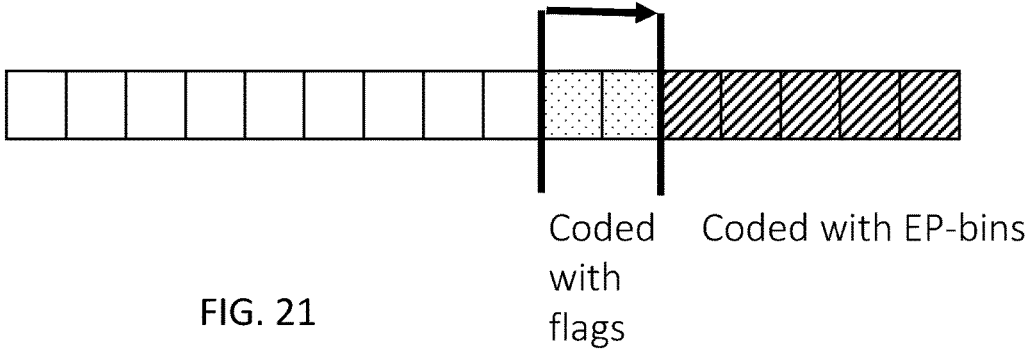
FIG. 21    Coded with flags    Coded with EP-bins

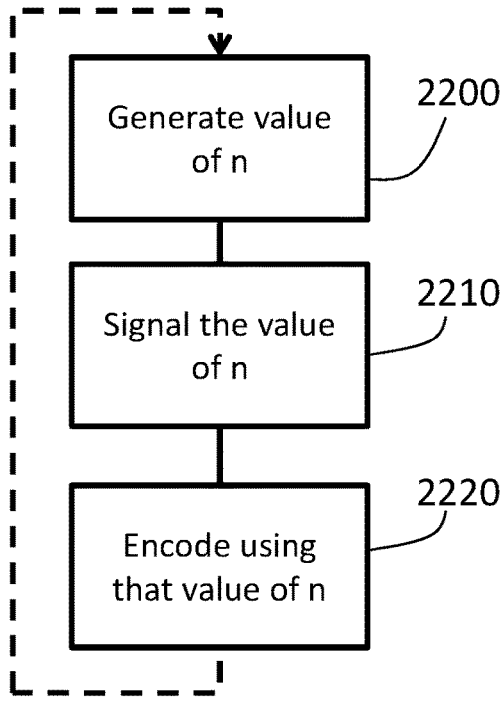
Generate value
of n          2200
Signal the value
of n          2210
Encode using
that value of n          2220
FIG. 22a
Receive signalled
value of n          2230
Decode using
that value of n          2240
FIG. 22b
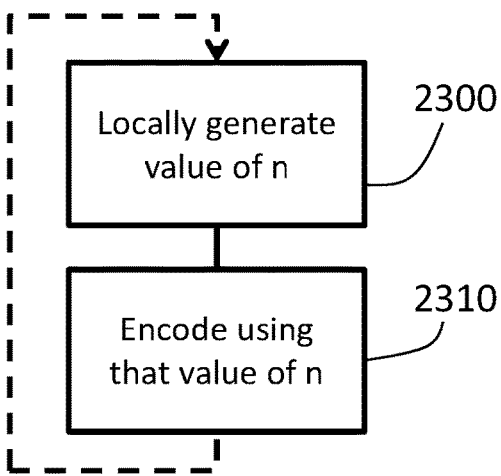
Locally generate
value of n          2300
Encode using
that value of n          2310
FIG. 23a
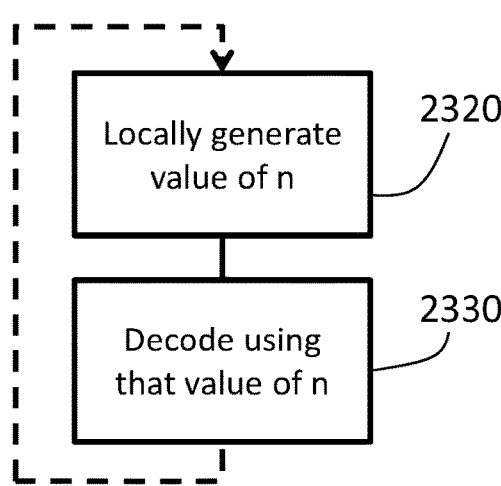
Locally generate
value of n          2320
Decode using
that value of n          2330
FIG. 23b 2400 Generate Rice parameter 2410 n = fixed offset from Rice parameter 2420 Initialise: s, c, n = 0 min_c = 8

2430 Count s and c

2440 Vary n and min_c depending on c and s/c; reset s and c when n changes 2500 encode 2510 select 2600 decode 2610 select Estimate residual — 2700

Generate histogram — 2710

Apply QP adjustment — 2720

Detect bin below which given proportion of values lie — 2730

Generate output — 2740

Generate >1 estimations of residual — 2800

Select amongst estimations — 2810

2910
2900
2920

No QP adjustment

QP adjustment of 20

QP adjustment of 40

Generate Rice parameter offset 3700

Signal the value of offset 3710

Encode using that value of offset 3720

Receive signalled value of offset 3730

Decode using that value of offset 3740

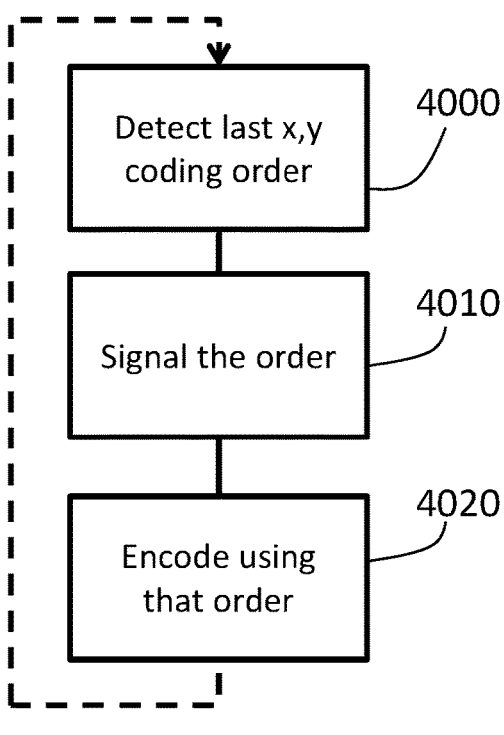
FIG. 40a
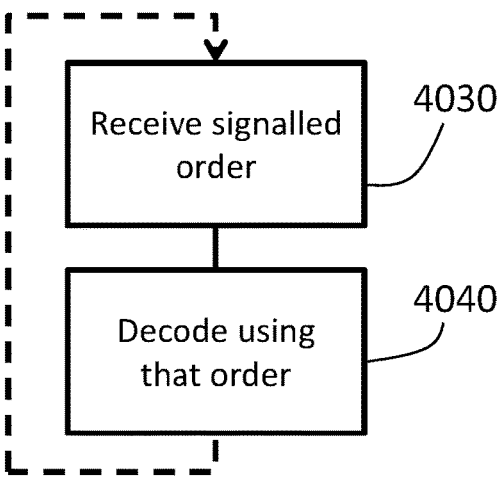
FIG. 40b
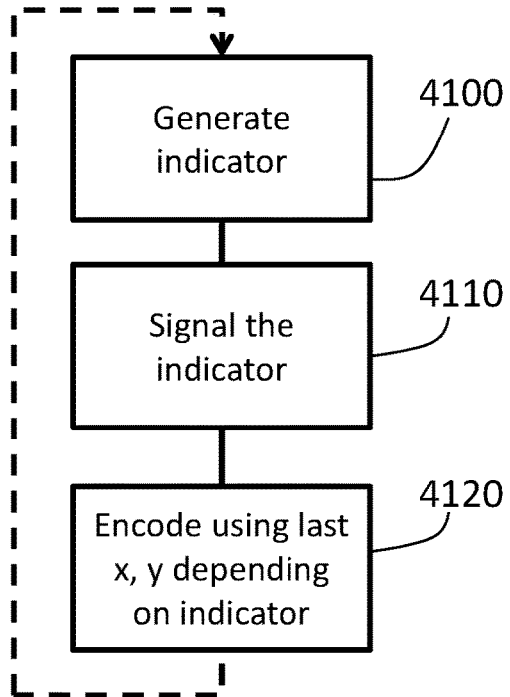
FIG. 41a
FIG. 41b

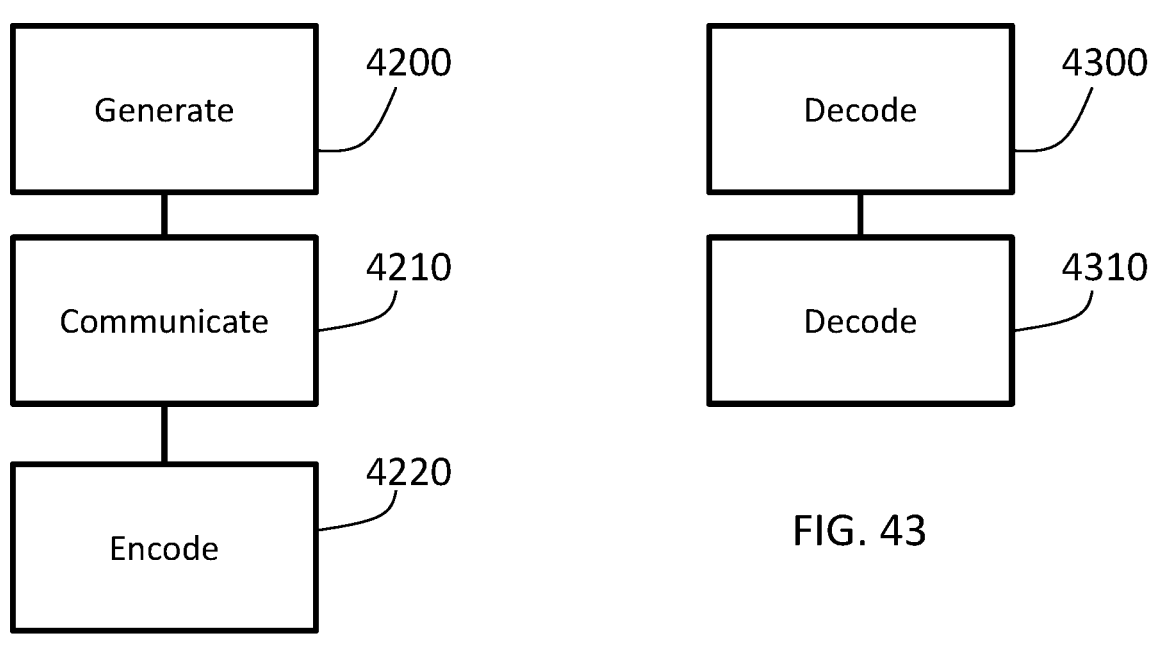
FIG. 42
FIG. 43
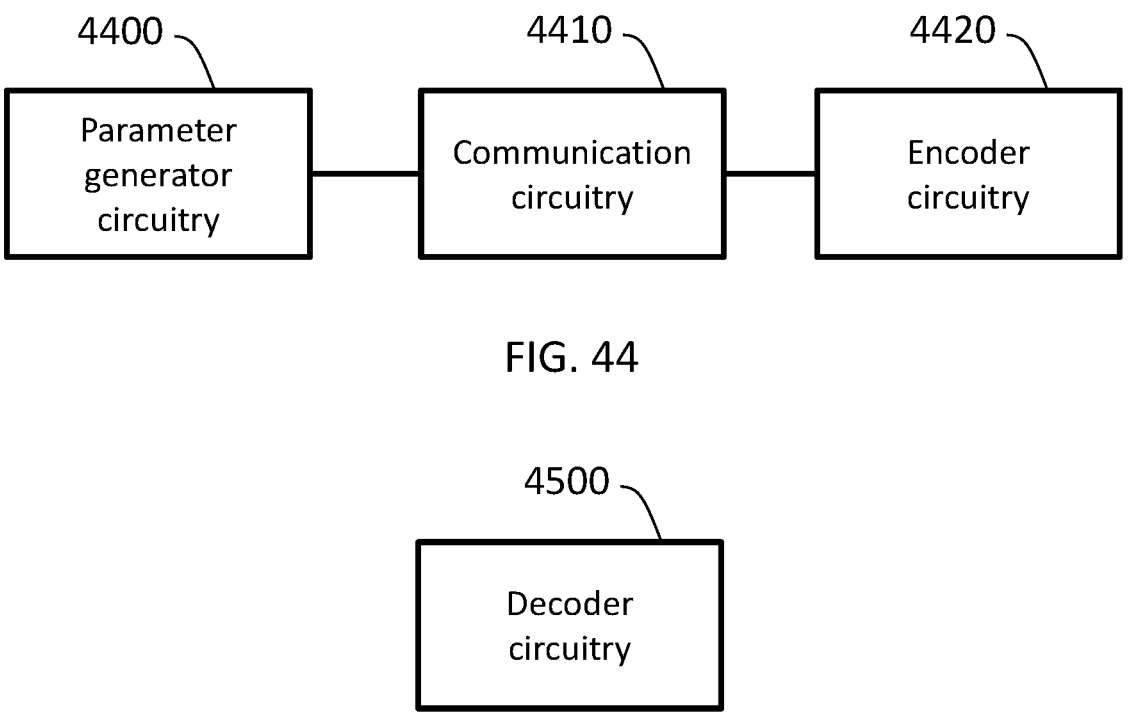
FIG. 44
FIG. 45

DATA ENCODING AND DECODING

CROSS-REFERENCE TO RELATED APPLICATIONS

The present application is based on PCT filing PCT/GB2022/051567, filed Jun. 20, 2022, which claims priority from GB 2109461.0, filed Jun. 30, 2021, the entire contents of each are incorporated herein by reference.

BACKGROUND

Field

This disclosure relates to data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several systems, such as video or image data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

In some examples, the entropy encoding process can involve generating one or more "data sets" (such as a significance map, a greater than one map, a greater than two map and/or other data sets) to describe a block of coefficients, with any excess values which cannot be encoded by the significance maps alone being encoded as so-called escape values. The coding of an escape value can (in some examples) be performed by generating a first portion (for example, a unary or truncated unary coded portion such as a prefix) and a non-unary coded second portion (such as a suffix) having a length, in bits, dependent upon a second portion size value.

SUMMARY

The present disclosure addresses or mitigates problems arising from this processing.

The present disclosure provides a data encoding method comprising:

generating one or more encoding parameters;

communicating the one or more encoding parameters for use by a decoding process; and encoding data items representing image data samples of an image by generating, in a generating step, residual data indicative of a difference between an image data sample and a predicted version of that image data sample, the encoding step performing the encoding in dependence upon the one or more encoding parameters generated by the generating step;

in which the generating step comprises deriving an estimate of the residual data in respect of a set of the image data samples and generating the one or more encoding parameters in dependence upon the derived estimate.

The present disclosure also provides a method of decoding image data comprising detecting one or more encoding parameters in one or more pictures and using the one or more encoding parameters to decode compressed data, the encoding parameters having been created by computer software according to the method defined above.

The present disclosure also provides a method of decoding successive image data samples, the method comprising:

decoding an indicator indicative of an aspect of the encoding, for a given block, data indicative of a location within that block of an image data sample having a predetermined property; and decoding the given block in response to the indicator.

The present disclosure also provides computer software which, when executed by a computer, causes the computer to perform any of such methods, and a non-transitory machine-readable storage medium which stores such computer software.

The present disclosure also provides apparatus comprising:

parameter generator circuitry configured to generate one or more encoding parameters;

circuitry configured to communicate the one or more encoding parameters for use by a decoding process; and encoding circuitry configured to encode data items representing image data samples of an image by generating residual data indicative of a difference between an image data sample and a predicted version of that image data sample, the encoding circuitry being configured to perform the encoding in dependence upon the one or more encoding parameters generated by the parameter generator circuitry;

in which the parameter generator circuitry is configured to derive an estimate of the residual data in respect of at least a subset of the image data samples and to generate the one or more encoding parameters in dependence upon the derived estimate.

The present disclosure also provides apparatus comprising:

decoder circuitry configured to decode image data; and decoder circuitry comprising detector circuitry configured to detect one or more encoding parameters associated with compressed data representing one or more pictures;

the decoder circuitry being configured to decode the compressed data using the one or more encoding parameters, the encoding parameters having been created by the apparatus defined above.

The present disclosure also provides apparatus comprising:

decoder circuitry configured to decode an indicator indicative of an aspect of the encoding, for a given block, data indicative of a location within that block of an image data sample having a predetermined property; and to decode the given block in response to the indicator.

The present disclosure also provides video data capture, transmission, display and/or storage apparatus comprising any of such apparatus.

Further respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 schematically illustrates a transform-skip mode;

FIGS. 10a, 10b, 11a and 11b schematically illustrate respective scanning directions;

FIG. 14 schematically represents an example of encoding a data word;

FIGS. 15 to 19 are schematic flowcharts illustrating respective methods;

FIGS. 20 and 21 schematically represent respective examples of encoding a data word;

FIGS. 22a, 22b, 23a, 23b, 24a, 24b and 25 to 28 are schematic flowcharts illustrating respective methods;

FIG. 29 schematically illustrates an aspect of the generation of a residual estimation;

FIGS. 40a, 40b, 41a, 41b, and 42 to 43 are schematic flowcharts illustrating respective methods; and FIGS. 44 and 45 schematically illustrate respective example apparatus.

DESCRIPTION OF THE PREFERRED EMBODIMENTS

Figures 1, 2, 3, 4, 5, 6:
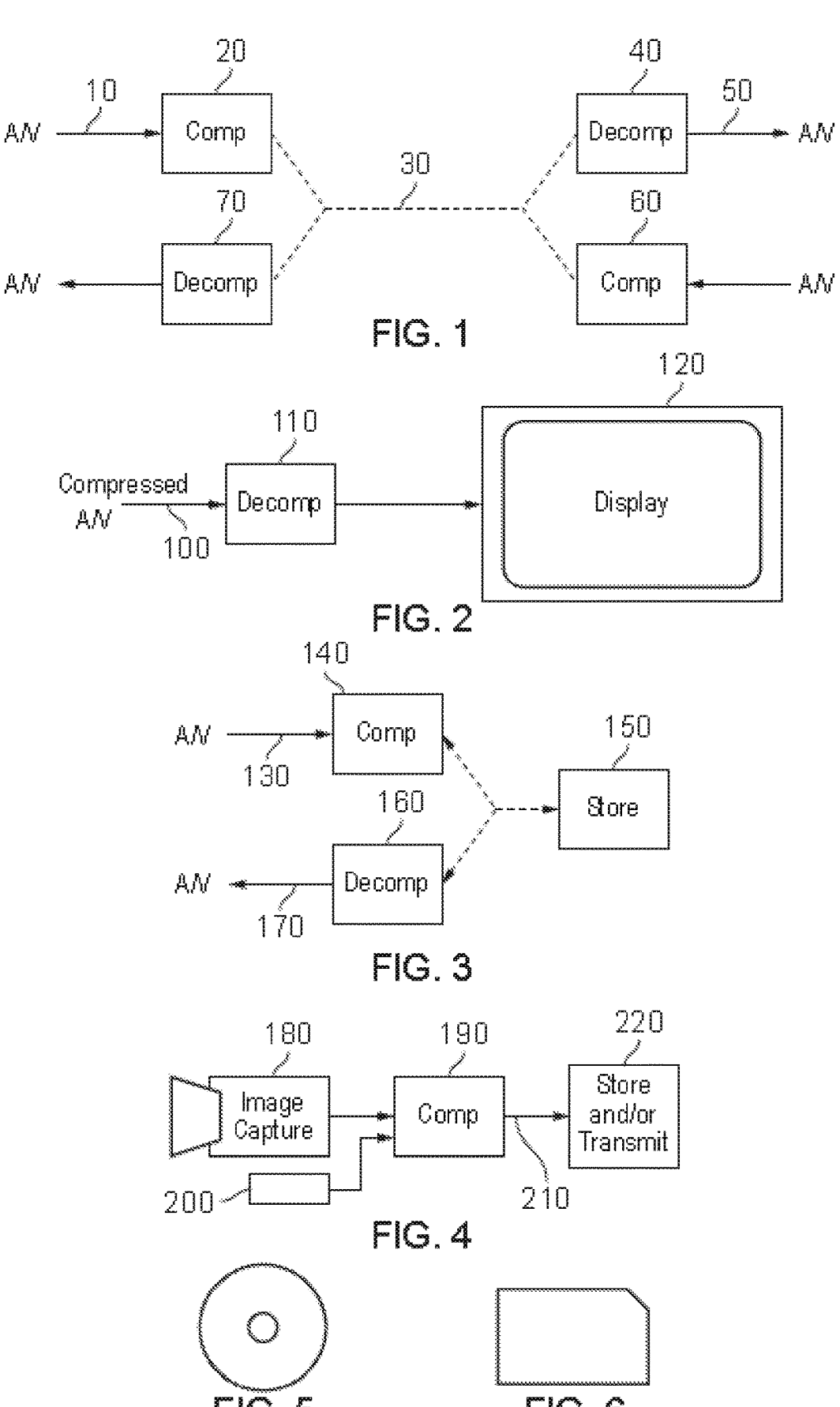
FIG. 1 schematically illustrates an audio/video (AN) data transmission and reception system using video data compression and decompression.
FIG. 2 schematically illustrates a video display system using video data decompression.
FIG. 3 schematically illustrates an audio/video storage system using video data compression and decompression.
FIG. 4 schematically illustrates a video camera using video data compression.
FIGS. 5 and 6 schematically illustrate storage media.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression. In this example, the data values to be encoded or decoded represent image data.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 may be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
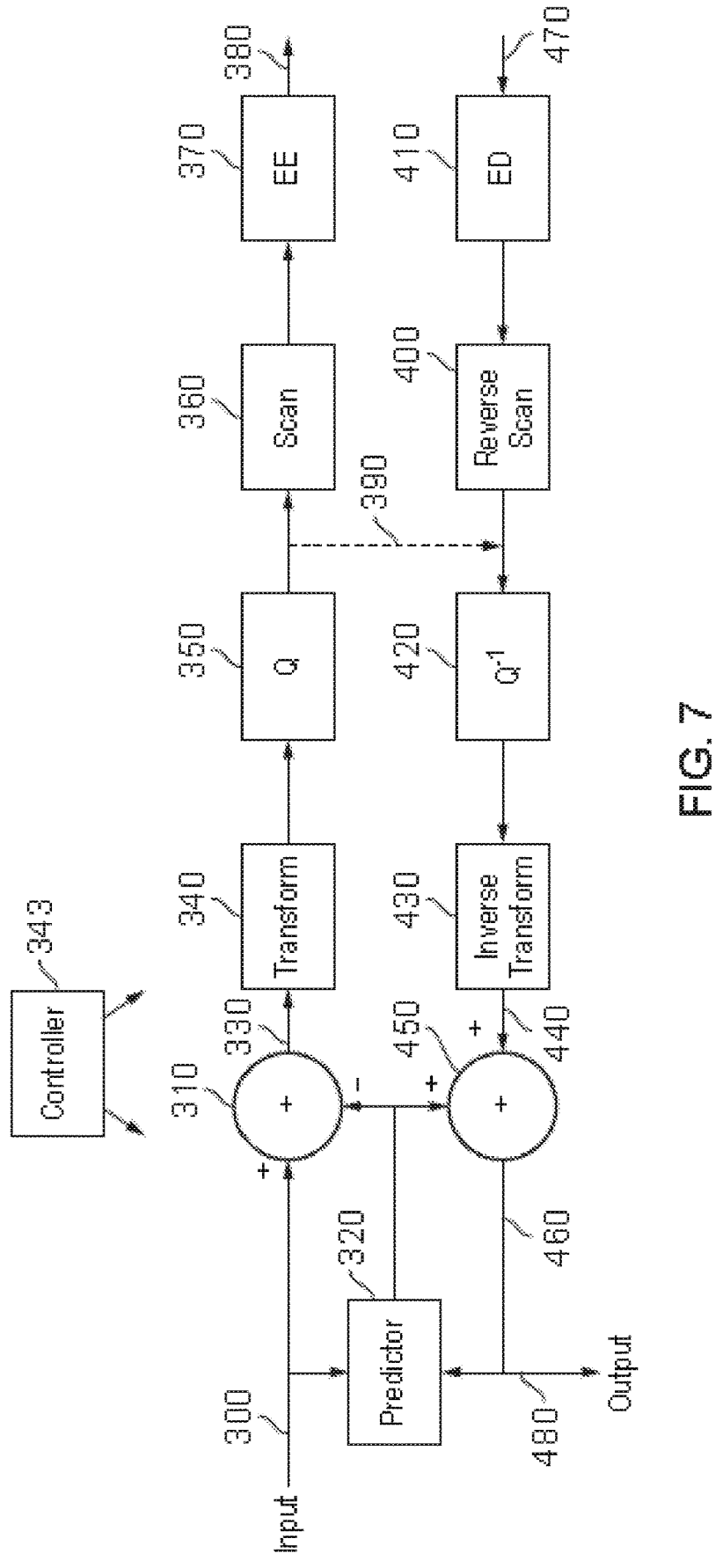
FIG. 7 provides a schematic overview of a video data compression and decompression apparatus.

FIG. 7 provides a schematic overview of a video or image data compression and decompression apparatus, for encoding and/or decoding image data representing one or more images.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to form part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and predicted images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

Therefore, encoding (using the adder 310) involves predicting an image region for an image to be encoded; and generating a residual image region dependent upon the difference between the predicted image region and a corresponding region of the image to be encoded. In connection with the techniques to be discussed below, the ordered array of data values comprises data values of a representation of the residual image region. Decoding involves predicting an image region for an image to be decoded; generating a residual image region indicative of differences between the predicted image region and a corresponding region of the image to be decoded; in which the ordered array of data values comprises data values of a representation of the residual image region; and combining the predicted image region and the residual image region.

The remainder of the apparatus acting as an encoder (to encode the residual or difference image) will now be described.

The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder. In other examples a so-called "transform-skip" mode can selectively be used in which no transform is applied.

Therefore, in examples, an encoding and/or decoding method comprises predicting an image region for an image to be encoded; and generating a residual image region dependent upon the difference between the predicted image region and a corresponding region of the image to be encoded; in which the ordered array of data values (to be discussed below) comprises data values of a representation of the residual image region.

The output of the transform unit 340, which is to say (in an example), a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a diagonal order such as a so-called up-right diagonal scanning order.

The scanning order can be different, as between transform-skip blocks and transform blocks (blocks which have undergone at least one spatial frequency transformation).

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, whether the compressed data was transformed or transform-skipped or the like, provides a compressed output video signal 380.

However, a return path 390 is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, so in the present embodiment the return path 390 is from the output of the quantiser 350 to the input of a complimentary inverse quantiser 420. In instances where loss or potential loss is introduced by a stage, that stage (and its inverse) may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460 (although this may be subject to so-called loop filtering and/or other filtering before being output—see below). This forms one input to the image predictor 320, as will be described below.

Turning now to the decoding process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480 (subject to the filtering processes discussed below). In practice, further filtering may optionally be applied (for example, by a loop filter 565 shown in FIG. 8 but omitted from FIG. 7 for clarity of the higher level diagram of FIG. 7) before the signal is output.

Figure 8:
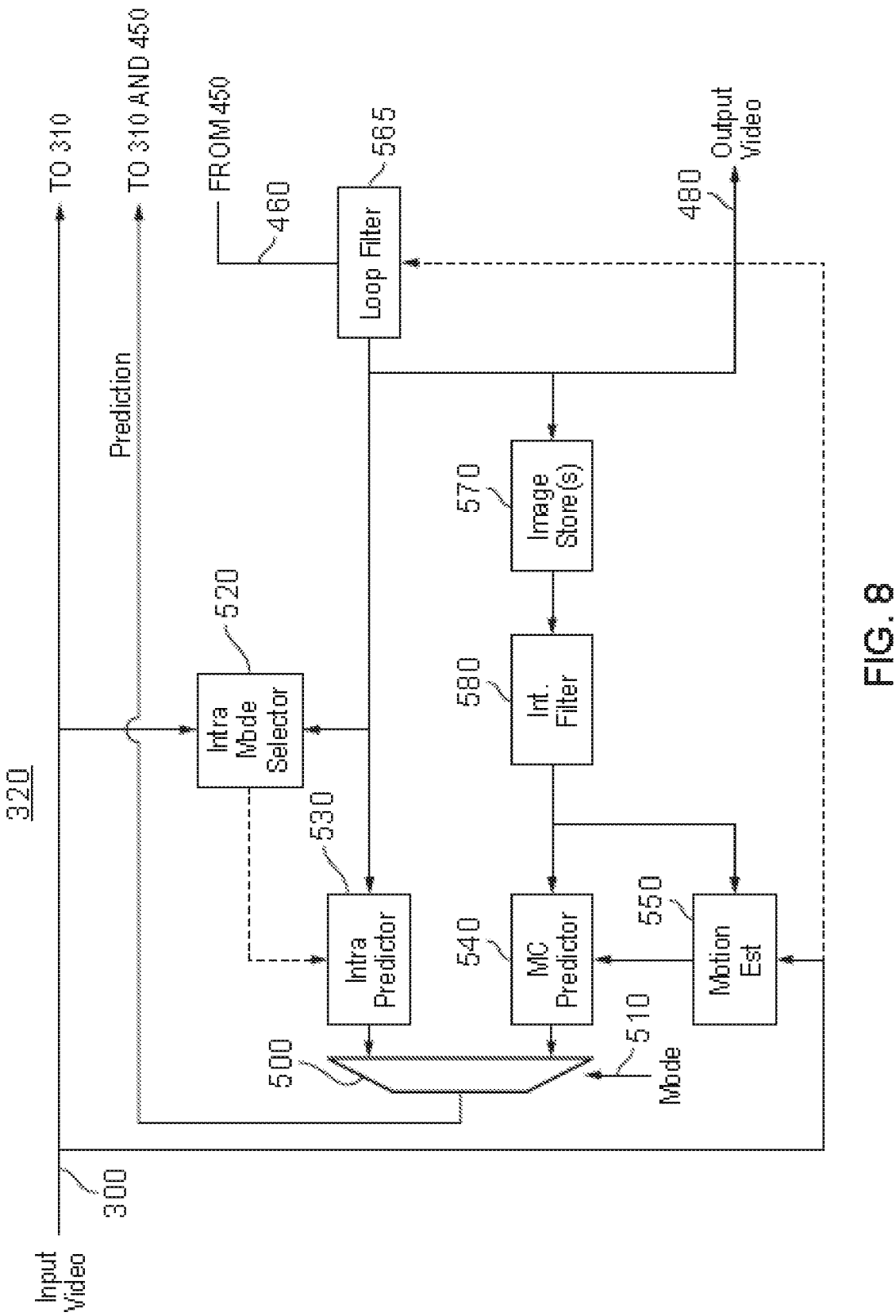
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output data-stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460 (as filtered by loop filtering; see below), which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described.

Firstly, the signal may be filtered by a so-called loop filter 565. Various types of loop filters may be used. One technique involves applying a "deblocking" filter to remove or at least tend to reduce the effects of the block-based processing carried out by the transform unit 340 and subsequent operations. A further technique involving applying a so-called sample adaptive offset (SAO) filter may also be used. In general terms, in a sample adaptive offset filter, filter parameter data (derived at the encoder and communicated to the decoder) defines one or more offset amounts to be selectively combined with a given intermediate video sample (a sample of the signal 460) by the sample adaptive offset filter in dependence upon a value of: (i) the given intermediate video sample; or (ii) one or more intermediate video samples having a predetermined spatial relationship to the given intermediate video sample.

Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the loop filter unit 565 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images may be passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in SERIES H: AUDIOVISUAL AND MULTIMEDIA SYSTEMS Infrastructure of audio-visual services—Coding of moving video High efficiency video coding Recommendation ITU-T H.265 12/2016. Also: High Efficiency Video Coding (HEVC) algorithms and Architectures, Editors: Madhukar Budagavi, Gary J. Sullivan, Vivienne Sze; chapter 3; ISBN 978-3-319-06894-7; 2014 which are incorporated herein in their respective entireties by reference.

In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks or arrays (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

Transform-skip mode FIG. 9 schematically illustrates a so-called transform-skip mode. In this mode, blocks of samples, for example rectangular encoding blocks or arrays of samples such as so-called transform units (TUs) are assigned a 'transform-skip' mode indicator, for example by a part of the functionality of the controller 343. When the transform-skip indicator is set, as shown by the schematic bypass path 900 in FIG. 9, the transform unit 340 (in the encoding path) and the inverse transform unit 430 (in the decoding path of the encoding side or in a decoder) is bypassed so that no spatial frequency transform is applied to the samples in that particular block.

The transform-skip mode is selectable by the controller 343, alongside a possible selection, of, DCT, DST or another transform mode, in dependence upon properties of the block in question, properties of nearby blocks, trial (full or partial) encodings or the like. Generally, the aim of the selection algorithm executed by the controller 343 is to improve the efficiency of the encoding of the block in question.

In some previously proposed example arrangements, transform-skip mode was restricted to 4×4 block sizes or smaller. In more recent examples, this restriction has been relaxed and the transform-skip mode can be selectively applied to larger blocks. The transform-skip mode can be applied to a TU even when the TU is actually processed as multiple (smaller) sub-TUs.

FIGS. 10a and 11a schematically illustrate respective scanning directions, with FIG. 10a providing an example applicable to a 4×4 transform-skip block and FIG. 11a providing an example applicable to a so-called transform block, which is to say a block for which transform-skip mode was not enabled and so the block has undergone a spatial frequency transform (or more than one frequency transform) by the transform unit 340 during encoding.

Referring to FIG. 10a, in the case of transform-skip blocks, the scan order is in this example a diagonal order from the top left ("1") to lower right ("16"). In contrast, as shown in FIG. 11a, in the case of a transform block (as an example of an encoding block) the scan order is a diagonal order from the lower right to top left. Note that the scan order in use makes little substantive difference to the techniques to be discussed below other than in terms of which coefficients or samples are available "already encoded" or "already decoded" for use in the derivation of encoding parameters for subsequent samples or coefficients.

In the case of larger blocks, a similar scan order can be used, or sub-blocks of (for example) 4×4 coefficients such as sub-TUs can be scanned as shown, with a predetermined pattern being used to scan each sub-block in order.

In general terms, the blocks of samples or coefficients may be considered as groups of data values (or, once encoded, groups of encoded data values), each having an associated encoding order (in other words, the scan order as illustrated by the examples of FIGS. 10a and 11a).

Referring to FIGS. 10b and 11b, in at least some examples of processing to be discussed below, reference is made to samples or coefficients (which may for convenience be referred to below by the single generic term "coefficients" even in the case of transform-skip blocks) which have been encoded or decoded before encoding or decoding of a given coefficient 1000, 1100. In the case of transform-skip, the previously handled coefficients relevant to at least some of the techniques discussed below will be coefficients in a predetermined grouping or pattern as shown in shaded form (one box for each coefficient), which are above and left of the given coefficient 1000. In the case of non-transform-skip operation, a similar predetermined pattern or grouping is used but here the previously handled coefficients relevant to at least some of the techniques discussed below are coefficients (shown shaded) below and to the right of the given coefficient 1100. As mentioned, these coefficients will be referred to by at least some techniques below. If any coefficient in the relevant shaded group is unavailable, for example because it would fall into another block or a not-yet encoded or not-yet-decoded block, that coefficient is simply omitted from the respective process and where necessary, the result of the process may be normalised to the reduced number of coefficients. (For example, normalisation is relevant to a process deriving a mean of the shaded coefficients but is not relevant to a process detecting a maximum or minimum of the shaded coefficients).

Data Sets and Escape Codes

The entropy encoding stage (for example, performed by the entropy encoder 370, with the inverse process being performed by the entropy decoder 410) involves encoding the scanned quantized transform coefficients (with the scan applied by the scan unit 360 being accorded to the examples shown in FIGS. 10 and 11 for transform-skip and transform blocks respectively).

The entropy encoding is arranged to encode the values as one or more so-called data sets along with escape codes for remaining values not encoded by the data sets.

To generate the data sets, the data values to be encoded are handled in the encoding order (for example the scan order). The data sets generated in respect of a block of samples such as a 4×4 block or a 4×4 (or other) sub-portion of a larger block are selectable as zero or more of a group of candidate data sets (which is to say, the data sets could be capable of being enabled, just not enabled for a particular coefficient or sub-TU or other block or group), where the group of candidate data sets may include one or more of the following.

Note that these parameters relate to previously proposed arrangements and are provided here by way of comparison with example embodiments to be discussed below.

Significance map (Sig) which indicates the position of so-called "significant" coefficients or samples, which is to say non-zero coefficients or samples. A significance flag indicating a non-zero value is coded for each coefficient position in the block.

greater than 1 flag (GT1) which indicates whether the absolute value is greater than 1 for each significant coefficient. In some examples for a 4×4 block, the flag is sent only for the first 8 significant coefficients in the encoding order; in other examples, it can be sent for each significant coefficient. In other examples the GT1 flag is always sent if the significance flag is sent.

"Value & 1" flag or parity flag is effectively the least significant bit (LSB) at this stage (where & signifies a logical AND operation).

greater than 2 flag (GT2) which indicates if the coefficient absolute value is greater than 2 up to and including the first coefficient in the scanning order with this property. Note that the flag is sent only for coefficients larger than 1 as indicated by the GT1 flag.

In some examples, after the occurrence of the first coefficient which is greater than 2 in the scanning order, the GT2 flag is not further sent. However, in at least some of the present examples being discussed, the GT2 flag may be sent at each calculated occurrence or at least up to a particular number of occurrences per coefficient for a sub-TU (such as up to four occurrences, the number of allowable occurrences being selectable for a sub-TU as discussed below).

In some examples, for Non-TS (non-transform skip) operation, the GT2 flag is coded whenever the GT1 flag is set. The limit of 4 applies to TS (transform skip) and may be applied up to 4 times to each coefficient or until it is not set. Thus if the first GT2 flag is not set then the value is 1 or 2 (depending on parity), if the first is set and the second is not set the value is 3 or 4, and if the first two are set by the third is not the value is 5 or 6 and so on.

Coefficient sign which is provided for the significant coefficients.

The absolute coefficient value (ABS(COEFF)) is modified in response to each coding pass of the above arrangement and the modified value is used in the next pass. The modification is:

At the generation of the significance map, subtract 1;
At the generation of the GT1 map, subtract 1;
At the generation of the value & 1 flag, divide by 2.

This provides an example in which, when one or more data sets are selected, encoding by a first technique comprises modifying the data value after encoding by a given data set to account for values which can be encoded by that data set.

In other words, a coefficient for which one GT2 flag has been generated in fact has a minimum value of 4, as shown in the following example in which each data set is shown in turn, with the following column indicating a remaining value (Val) to be encoded after the modification mentioned above:

| Val (i/p) | Sig | Val | Gt1 | Val | Val&1 | Val | Gt2 |
|-----------|-----|-----|-----|-----|-------|-----|-----|
| 0 | 0 | | | | | | |
| 1 | 1 | 0 | 0 | | | | |
| 2 | 1 | 1 | 1 | 0 | 0 | 0 | 0 |
| 3 | 1 | 2 | 1 | 1 | 1 | 0 | 0 |

-continued

| Val (i/p) | Sig | Val | Gt1 | Val | Val&1 | Val | Gt2 |
|-----------|-----|-----|-----|-----|-------|-----|-----|
| 4 | 1 | 3 | 1 | 2 | 0 | 1 | 1 |
| 5 | 1 | 4 | 1 | 3 | 1 | 1 | 1 |
| 6 | 1 | 5 | 1 | 4 | 0 | 2 | 1 |

Escape Codes

Escape codes are used to encode the remaining absolute level, which is to say level information which has not been encoded by the data sets outlined above. Because of the effective subtraction of 4 discussed above, in an arrangement in which one GT2 flag is always sent when it is applicable, the remaining absolute level needs to be encoded only for "coeff–4". Where more than one GT2 flag is sent for a coefficient, the offset is increased to represent the increasing contribution to the value represented by each successive GT2 flag.

The remaining absolute level is encoded by an escape code, for example, comprising a first portion and a non-unary coded second portion. The second portion may have a length, in bits, dependent on a second portion size value defined by a so-called Rice parameter.

Such an arrangement may be referred to as a Golomb-Rice code in which a value to be encoded is considered as two portions (the first and second portions mentioned above). The first portion is the result of the division of the value to be encoded by M, where $M=2^b$, and the second portion is the remainder for example b least significant bits of the value to be encoded. In the discussion provided here, the parameter b is referred to as the second portion size value.

In examples, the quotient or first portion is encoded using unary coding and is followed by the remainder encoded using, for example, truncated binary encoding. Note that if M=1, then this coding is equivalent to unary coding.

In example embodiments the first portion is a prefix and the second portion is a suffix. For example, the first portion may comprise a unary encoded value. For example, the first portion may comprise a truncated unary value. Note however that the terms "first" and "second" are simply identifiers and do not necessarily imply any requirement for the first portion to precede the second portion in an encoding or transmission order.

Apparatus for Coding and Decoding Data Sets and Escape Codes

Figure 12:
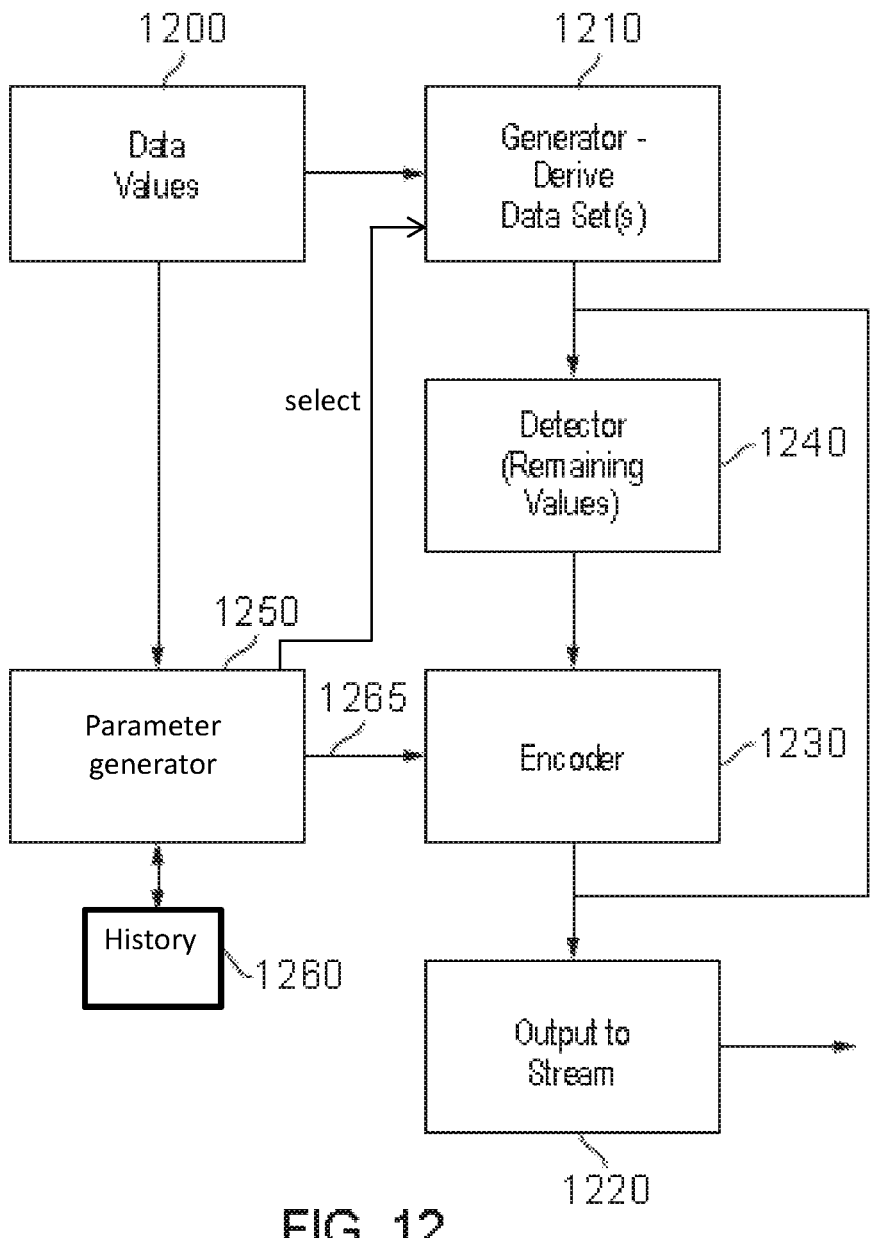
FIG. 12 is a schematic diagram illustrating an encoding apparatus.

FIG. 12 schematically illustrates an example encoding apparatus.

Referring to FIG. 12, data values 1200 are received in the scanning order from the scan unit 360. A generator 1210 generates the data sets described above, namely the significance map, the GT1 flag, the LSB or parity (val & 1) flag and the GT2 flag. These are provided to an output unit 1220 for output to the encoded data stream.

An encoder 1230 encodes the escape codes. The encoder 1230 is responsive to a detector 1240 which detects whether there are any remaining absolute values to be encoded, and also to a generator 1250 which generates the second portion size value; this processing being performed using previously proposed techniques.

In other words, detection is made as to whether the current data value exceeds the maximum which can be encoded by the data sets in use.

The generator 1250 can generate a second portion size value 1265 in respect of each data value 1200, whether or not that data value requires an escape code. Alternatively, a second portion size value may be generated only in respect of data values which do in fact need an escape code.

The encoder 1230 then performs the escape code encoding as discussed above and provides the escape codes to the output unit 1220 for output to the data stream.

In the case that a remaining value is too large to be entirely represented by an escape code (which is to say, the value is larger than the maximum value which can be represented by an escape code using the prevailing parameters), a further type of code (an escape-escape code) may be provided.

Figure 13:
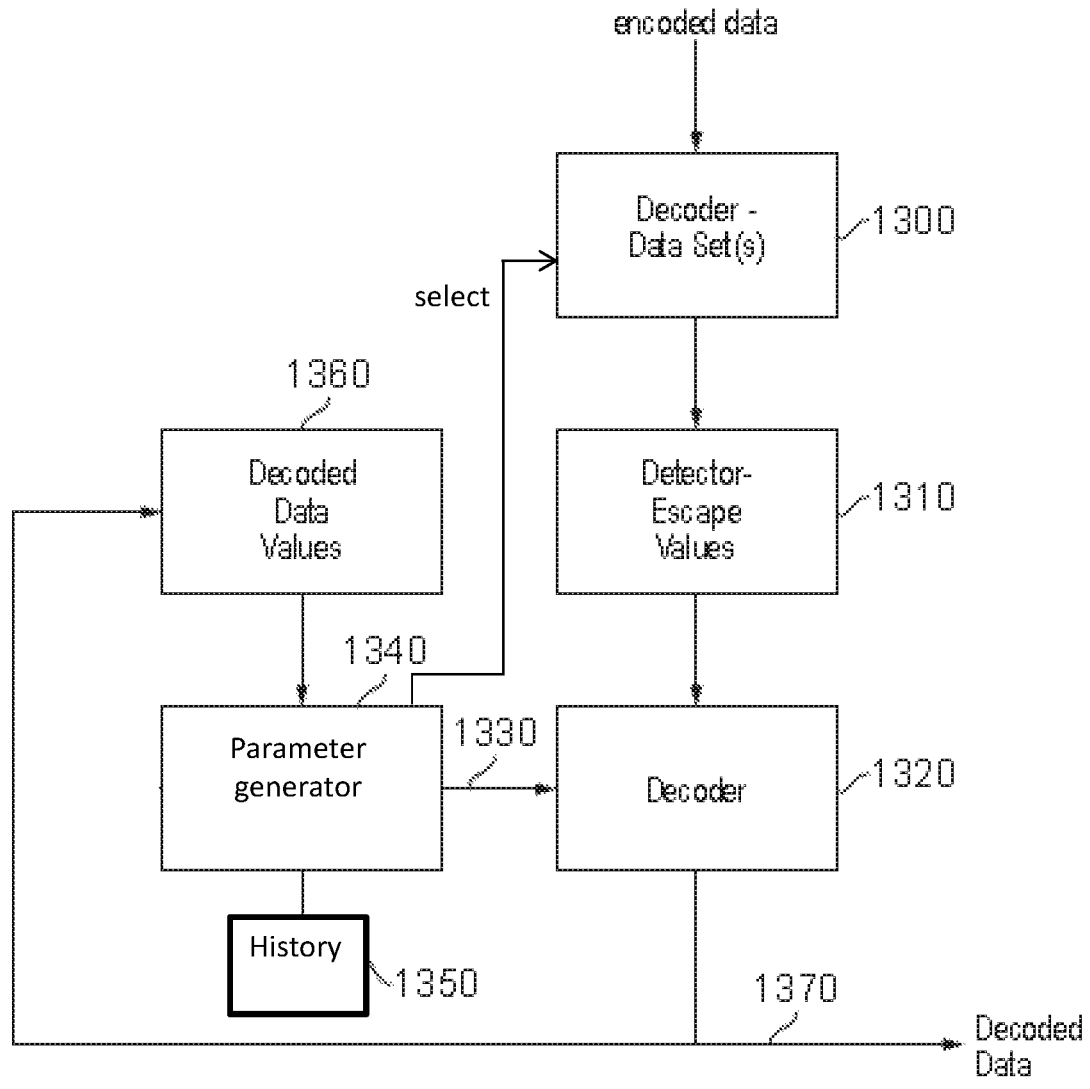
FIG. 13 is a schematic diagram illustrating a decoding apparatus.

Referring to FIG. 13, a decoding apparatus comprises a data set decoder 1300 configured to decode the data sets (up to the GT2 flag) discussed above. A detector 1310 detects whether any escape codes or values are provided and, if so, passes these to an escape code decoder 1320 which applies an inverse operation to the escape code encoding, namely a Golomb-Rice decoding. In order to do this, the decoder 1320 makes use of second portion size value information 1330 provided by a generator 1340 which corresponds in function to the generator 1250.

The decoder 1320 decodes the escape code(s) using the second portion size value information 1330 and outputs the combination of the decoded data sets with any decoded escape codes as decoded data 1370 which forms the output of the process and which also forms the input 1360 to the generator 1340.

Examples of Encoding and Decoding Techniques

In contrast to the use of the significance data discussed above, example embodiments make use of a different or modified significance flag, to be explained below. This is applicable to various types of data words, but in these examples the data items are multi-bit data words (for example, p-bit words). They may be video data items representing a video signal and in some examples the significance flag or indicator is configured to indicate whether or not an absolute value of the given data item has a value of at least a first threshold value.

In the previously proposed examples discussed above, the significance flag related to whether the absolute value of a coefficient exceeded zero (or in other words, is greater than or equal to one). In example embodiments, the threshold against which the significance test is carried out can be greater than 1, for example the test may be $>=2^n$ where n is an integer potentially greater than 0. This addresses a potential issue when video data relating to high bit depth video signals (for example, bit depth>10 bits) are in use, because the likelihood of coefficients generated from such data passing the previously proposed significance test ($>=1$) is potentially higher than such likelihood would be for lower bit depth video data. This changed likelihood can render the previously proposed significance test less useful for high bit depth video data.

In some examples, the value of n can be adaptive and, in some examples at various times within the processing of the video data, may be 0 (which would provide a significance test equivalent to the previously proposed test) but the adaptive nature of n allows significance tests based on higher thresholds to be applied. In general, the threshold value for the significance test may be an integer equal to $2^n$ where n is an integer of zero or more.

In other examples, n can be constrained to be at least 1.

In example embodiments, the significance flag is generated to indicate whether the absolute value of a coefficient is greater than or equal to $2^n$, where n is an integer greater than zero. For example, if n=7 then the significance test is effectively shifted left (in a more significant direction) to be a test of whether a coefficient is greater than or equal to 128. This is represented schematically by FIG. 14 which illustrates a 16 bit data value, each box representing a bit position, with the most significant bit (MSB) drawn to the left and the least significant bit (LSB) drawn to the right. The significance test is applied at n=7, which is to say "is the value greater than or equal to $2^7$?"

In some situations, a per-block allowance of context coded bins for coefficient coding may be exhausted. For example, this may provide for the coding of (say) 28 flags for a given 4×4 sub-block. In this situation (once the available flags have been used) the significance flag is not coded and the value in the upper bits may be coded using another mechanism, for instance Rice coding.

The lowest 7 bits are shaded in FIG. 14 and are referred to in the following discussion as "insignificant". Note that this is simply a term to distinguish them for the purposes of the present discussion and does not represent any assessment of their real importance in any particular system.

Figures 14, 15, 16:
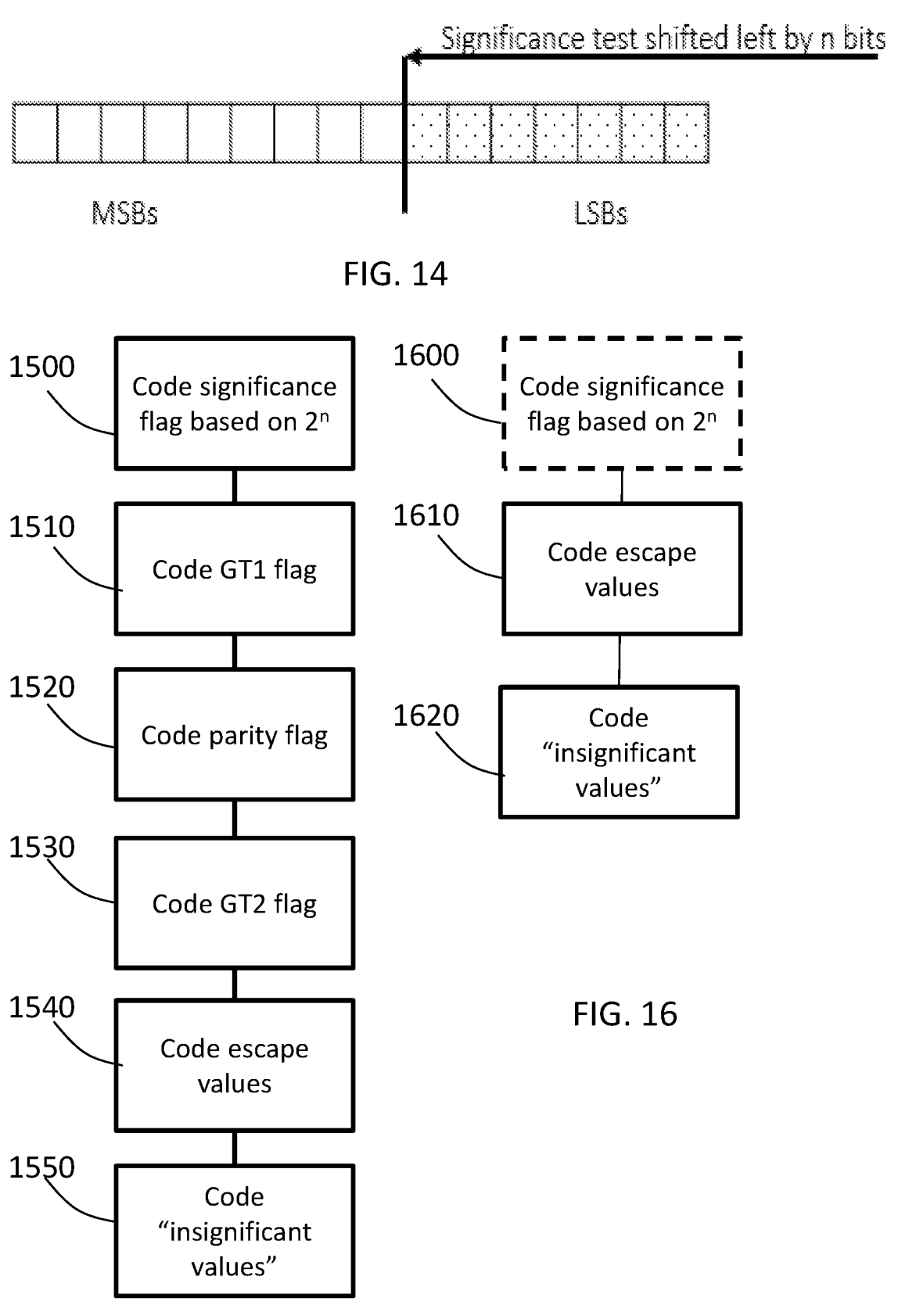

Unshaded bit positions in FIG. 14 represent bit positions above the threshold of the significance test. If the significance test at $2^n$ is not passed, then there are no bits in this range to be encoded. However, if the significance test is passed such that the data word is at least $2^n$ then further coding of higher order bits may be required. Bits above the threshold which require or may require encoding are referred to (again, purely for the purposes of the discussion without any suggestion as to real importance) as "significant" bits or values.

This arrangement leads to various considerations, each of which will be discussed in more detail below. These are: (a) how to code "significant" values; (b) how to code "insignificant" values; (c) how to determine the value of n.

Regarding (a) and (b), this can provide an example in which, for a p-bit data item for which n is greater than zero, the technique comprises encoding a first portion of the data item represented by the least significant n bits by a first encoding technique; and encoding a second portion of the data item represented by the most significant (p-n) bits by a second encoding technique. In some examples, the first encoding technique may be different to the second encoding technique.

(a) Coding Significant Values

Referring to FIG. 15, in some examples, coding of the significant bits is conducted using techniques similar to those of the previously proposed systems discussed above but from a starting point of the significance threshold of $2^n$.

At a step 1500, the significance flag is coded based on the test of whether the absolute value of the coefficient is greater than or equal to $2^n$.

If the coefficient is significant, then at a step 1510 the GT1 flag is encoded as the Boolean result:

$$GT1=((\text{absolute value of coefficient})>>n)>1$$

Here ">>n" represents a right shift by n bits. If GT1=true, then at a step 1520 the parity flag is encoded as $$parity=((\text{absolute value of coefficient})>>n) \& 1$$

At a step 1530, the GT2 flag is coded as:

$$GT2=(((absolute\ value\ of\ coefficient)>>n)-parity)>2$$

If the GT2 flag is set, then at a step 1540 any remainder is coded as escape codes, for example using Rice coding, where:

$$remainder=(((absolute\ value\ of\ coefficient)>>n)-4)>>1$$

At a step 1550 any insignificant bits are coded using techniques to be discussed below.

Another example arrangement is shown schematically in FIG. 16.

Here, the coding can be performed just using Rice coding (as though escape values are being coded). Or, optionally, the significance flag can first be coded at a step 1600 (corresponding to the step 1500 discussed above). Any significant bits or 0 if the significance flag is not coded are then encoded by Rice coding at a step 1610, and at a step 1620 any insignificant bits are encoded using techniques to be discussed below.

Coding the significance flag as discussed above and coding zero or more further flags provides an example of encoding using one or more data sets comprise:

- a significance data set comprising the significance indicator;
- and zero or more further data sets selected from the list consisting of:
- one or more greater-than-m data sets indicating whether a given data item is greater than a respective value of m, m being greater than the first threshold value; and
- a parity data set indicating a value of a least significant bit of a data item.

Therefore, in some examples, the second encoding technique comprises generating one or more of the further data sets. In examples, the second encoding technique comprises, for any excess value of the given data item, the excess value being an amount by which the given data item exceeds a maximum value which can be encoded by the significance data set and the one or more further data sets, encoding the excess value as an escape code comprising a first portion and a non-unary coded second portion having a length, in bits, dependent upon a second portion size.

(b) Coding Insignificant Values

Various options are presented in the following description. Note that there may be "insignificant" bits (indicating portions of the word value represented by the n LSBs) whatever the result of the significance test. Therefore arrangements need to be provided to allow these n bits to be encoded whether or not the significance test is passed (potentially however using a different LSB encoding technique depending on the outcome of the significance test). Example arrangements are discussed with respect to FIGS. 17-19. FIG. 20 schematically illustrates the n LSBs to be encoded.

Referring to FIG. 17, a first possibility is simply to encode (at a step 1700) any data represented by the n LSBs using equiprobable (EP) CABAC bins.

Referring to FIG. 18, the n LSBs can be encoded using secondary flags, which is to say similar flags to the previously proposed system, for example a second significance flag (a test of greater than or equal to 1) plus one or more subsequent flags such as GT1, parity, GT2 and the like. In some examples, GT2 may be not used. By not coding GT2 the maximum number of flags coded is kept to 4 (primary and secondary significance+GT1+parity). This changes the offset in the calculation for the remainder from 4 to 2. Values of the n LSBs above the limit which can be encoded by the secondary flags may be coded as escape codes. In FIG. 18, the flags are generated at a step 1800 and the n LSBs are encoded at a step 1810.

In FIG. 19, a second significance flag is again used (and indeed is generated at a step 1900) and the n LSBs are encoded at a step 1910. A difference with respect to FIG. 18 is that the second significance flag is not representative of a test of whether the absolute coefficient value is $>=1$, but rather of whether the absolute coefficient value is $>=2^{(n-m)}$, where m is a predetermined integer less than or equal to n.

If n=1 then m=1. Otherwise, if n>1, then m<n.

For example, where n=7 as in this example, m may equal 2 so that the secondary significance test is implemented 2 bits to the right (a less significant direction) relative to the primary significance test, as shown schematically in FIG. 20.

Here, the second significance test may be expressed as a test of: (absolute coefficient value»max (n−m,0))>0 Although, as mentioned above, the n LSBs have to be encoded in some form whether or not the second significance test is passed. However, the approach or technique used to encode them can differ in dependence upon the outcome of the second significance test.

In an example, in FIG. 21, where (in this example) m=2 and n=7, and numbering the bits from the LSB as bit 0, then the following technique may be used:

If the second significance test is passed, then apply (i) and (ii) below:

- (i) code bits 6 and 5 as:
  - second significance flag (though note that if n=1 or m=1 then this is all that must be coded—there is no need for GT1 or parity);
  - GT1 flag as (absolute coefficient value»max (n−m,0))>1
  - if GT1 is set and n>1, code parity as (absolute coefficient value»max (n−m,0)) & 1
- (ii) If n>2 then code remaining LSBs (bits 0-4 in this example) as EP CABAC bins.

If the second significance test is not passed, then apply (i) and (ii) below:

- (i) if n>2, code remaining LSBs as EP CABAC bins
- (ii) note that if n=1 or 2, the bits are already coded using the flags above so there is no need for further coding of the LSBs.

Therefore, in at least some examples, the first encoding technique comprises encoding at least some of the least significant n bits by equiprobable binary arithmetic coding. In examples, the first encoding technique comprises generating a second significance indicator in respect of a second threshold value lower than the first threshold value.

(c) How to Determine the Value of n

The value of n can be signalled in the bit stream, derived by corresponding or symmetrical processes at the encoder and decoder sides, or predetermined. In some examples, the value of n can be adaptive, for example using equivalent techniques at the encoder and the decoder side so that the same adaptation can be performed equivalently at both sides, for example by the controller 343 in each case. Multiple values of n may be signalled, for example by component, component type, block size, whether transform or transform skip or the like. The value could be signalled once per sequence, once per slice, once per CTU, once per image or the like.

FIG. 22*a* provides a schematic overview of such a process at the encoder side, in which a value of n is generated at a step 2200, the value of n (or a representation of it) is signalled, for example in a picture header or parameter set at a step 2210 and one or more coefficient values (for example those representing a whole picture) are encoded at a step 2220 using the generated value of n, before control returns to the step 2200 where a next value of n is generated.

In FIG. 22*b*, the equivalent process at the decoder side is shown in which, at a step 2230, the decoder receives a signalled value of n (as provided at the step 2210) and at a step 2240 decodes one or more coefficient values (for example those representing a whole picture) before returning control to the step 2230.

By way of comparison (in the sense that FIGS. 23*a* and 23*b* are applicable to embodiments described above but not to those described with respect to FIG. 27 in which the relevant parameters are derived and encoded by the encoder side), FIGS. 23*a* and 23*b* schematically illustrate steps at the encoder and decoder side respectively in which there is no need to signal the value of n (or other parameter) as between the encoder and decoder. In particular, in FIG. 23*a*, at a step 2300, a value of n is generated locally (that is to say, at the encoder side) and is used to encode one or more coefficient values at a step 2310. Similarly, at the decoder side, the value of n is also generated locally from information available to the decoder at a step 2320 and at a step 2330 one or more coefficient values are decoded using that value of n.

Figure 24A:
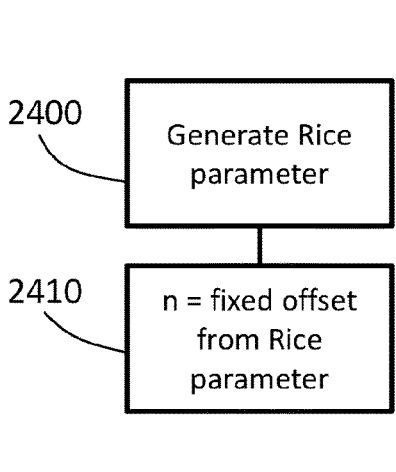

An example of the step 2200 shown in FIG. 24*a* is that the value of n is expressed as an offset amount (for example, +p or −p, where p is an integer greater than zero) relative to a Rice parameter generated for the encoding of any escape codes relevant to the current coefficient. The offset amount can be predetermined. In FIG. 24*a*, a step 2400 concerns generating the Rice parameter (which may well be performed anyway as a separate part of the encoding process) and a step 2410 involves generating n as a fixed or predetermined offset from the generated Rice parameter.

Figure 24B:
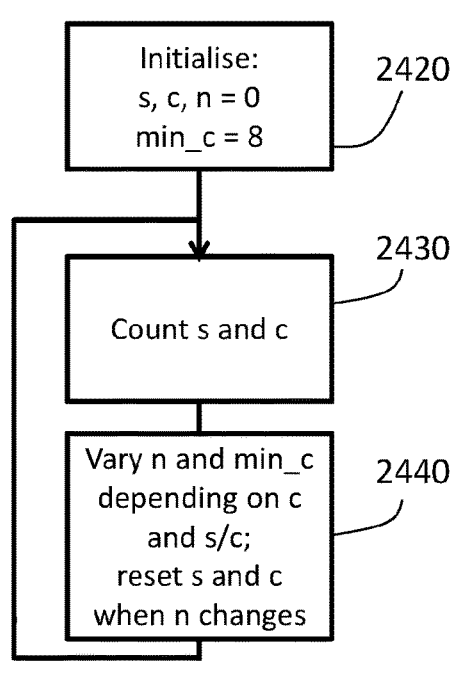

A further example is illustrated schematically in FIG. 24*b*. Here the value of n is based on a significance metric. At a step 2420 values are initiated, namely:

n=0 (n is the value used to define the significance test as discussed above);

s=0 (s is a count of significant coefficients, which is to say the number of coefficients which have passed the significance test defined by the prevailing n);

c=0 (c is a count of the number of coefficients coded); and min_c=8 (min_c is a threshold lower limit on the value c before any variation is made to n at a step 2440 to be discussed below).

As each coefficient is coded, c and (if appropriate) s are incremented by 1 at a step 2430.

Then, at a step 2440, n is adaptively varied. The process may for example be as follows:

if c<min_c then take no action else if s/c>upper_threshold then n=n+1; double the prevailing value of min_c and reset s, c to 0;

else if s/c<lower_threshold then n=n−1 (subject to a constraint that it never goes below zero) and double the value of min_c and reset s, c to 0;

In other words, c has to equal at least min_c (which doubles each time n is changed) for any change to n to take place.

When n is changed, whether as an increment or a decrement, min_c may be changed (for example doubled) and s and c are both reset to zero.

upper_threshold and lower_threshold may be, for example [0.8; 0.6] for low n (for example below 5). For higher n, an example is [0.6, 0.4].

If neither of the threshold tests for s/c is passed then no change is made to n or min_c.

The process can be reset (the step 2420) at the start of coding a slice or coding tree unit, CTU (or other block).

These techniques provide examples of adaptively varying the first threshold value in response to data values of encoded data items, for example in which the adaptive variation comprises varying the first threshold value in response to a proportion (such as s/c) of encoded data items for which the significance indicator indicates that those data items had a value of at least the first threshold value.

In other examples, n can be reset to 1 or another integer higher than zero and constrained so as not to go below 1 (or that other integer) in the adaptive process discussed above.

Possible Changes to the Meaning of the Significant Block or Sub-Block Flag

The significant sub-block flag may be taken to indicate that at least one value in the sub-block passes the new significance test (do any coefficients have absolute value>=2″?) This provides an example of encoding (or at the decoding side, decoding) an indicator, for a block of the data items, indicating whether any data item in the block of data items has an absolute value of at least the first threshold value.

The shift by n bits can be performed on each coefficient or at the end of processing a block or sub-block. Applying the shift at the end of processing allows equivalent processing to be used (compared to that used in previously proposed systems) within the handling of a block or sub-block, for example any processes dependent upon neighbouring values within the block or sub-block. In examples, if the significant sub-block flag is not set, no further coding of the significant proportion of each coefficient is done for the sub-block and the significant proportion of each coefficient in the sub-block is set to zero. In such cases, just the LSBs are coded as the insignificant values. The insignificant values can be EP-encoded for example at the end of the block or sub-block, and then combined back into the block at decoding after the rest of the processing has been performed. By keeping them together in this way, the CABAC bitstream can be potentially better aligned.

This therefore provides an example of grouping the least significant bits for a block of data items, encoded by equiprobable binary arithmetic coding, together in an output data stream, after the encoded first portions of the data items of that block of data items.

At the decoding side, this arrangement provide an example of, for a block of data items:

decoding the first portions of the data items of that block of data items using a value of n=0;

applying a bit shift of n bits to the decoded first portions of the data items;

decoding the second portions of the data items for that block of data items; and combining the decoded second portions of the data items with respective bit-shifted first portions generated by the applying step.

The significant block flag may be taken to indicate that at least one value in the block passes the new significance test (abs value>=2″). If the significant block flag is not set, no further coding of the significant proportion of each coefficient is done for the block and the significant proportion of each coefficient in the block is set to zero. If the significant block flag is set, sub-blocks are coded. The significant block flag is not coded (and assumed to be set) if n is zero.

Further Examples

As a further example, a pseudo Rice parameter may be generated. This assumes that a history store is provided, as in GB 2015486.0 and GB 2009255.7 (the contents of each of which are hereby incorporated by reference). Assume that the history stored contains an array of counters (split potentially as before) called say shiftCounters which are updated for each coefficient. In the above cases this was limited in some examples to non-zero coefficients but here updated for all.

```
shiftCounter = select one of shiftCounters
shift = shiftCounter / divisor;
 if (abs(value) >= (3 << shift)) {
shiftCounter += increment;
} else if ((abs(value) << 1) < (1 << shift)) {
shiftCounter = std::max(0, count – decrement);
}
```

For this proposal generally better to underestimate n hence decrement>increment in the referenced arrangements. When coding use n=shift as calculated above.

Worked Example—Significance Test

| | Tests for flags | | | |
|---|---|---|---|---|
| Shift | Significance | GT1 | GT2 | Parity |
| 0 | Val >= 1 | Val >= 2 | Val > 2 | (Val & 1) != 0 |
| 1 | Val >= 2 | Val >= 4 | Val > 4 | (Val & 2) != 0 |
| 2 | Val >= 4 | Val >= 8 | Val > 8 | (Val & 4) != 0 |
| 3 | Val >= 8 | Val >= 16 | Val > 16 | (Val & 8) != 0 |
| 4 | Val >= 16 | Val >= 32 | Val > 32 | (Val & 16) != 0 |
| 5 | Val >= 32 | Val >= 64 | Val > 64 | (Val & 32) != 0 |
| 6 | Val >= 64 | Val >= 128 | Val > 128 | (Val & 64) != 0 |
| 7 | Val >= 128 | Val >= 256 | Val > 256 | (Val & 128) != 0 |

Worked Example, Coding 85 (1010101)

| | Flags (For each flag add 1 except GT2 add 2) | | | | Value coded | Value coded | Insignificant |
|---|---|---|---|---|---|---|---|
| Shift | Significance | GT1 | GT2 | Parity | with flags | with rice | value to code |
| 0 | 1 | 1 | 1 | 1 | 5 << 0 = 5 | 40 << 1 = 80 | 0 (0 bits) |
| 1 | 1 | 1 | 1 | 0 | 4 << 1 = 8 | 19 << 2 = 78 | 1 (1 bit) |
| 2 | 1 | 1 | 1 | 1 | 5 << 2 = 20 | 8 << 3 = 64 | 1 (2 bits) |
| 3 | 1 | 1 | 1 | 0 | 4 << 3 = 32 | 3 << 4 = 48 | 5 (3 bits) |
| 4 | 1 | 1 | 1 | 1 | 5 << 4 = 80 | 0 | 5 (4 bits) |
| 5 | 1 | 1 | 0 | 0 | 2 << 5 = 64 | NA | 21 (5 bits) |
| 6 | 1 | 0 | NA | NA | 1 << 6 = 64 | NA | 21 (6 bits) |
| 7 | 0 | NA | NA | NA | 0 | NA | 85 (7 bits) |

Note that the "value coded with rice" is the value on left of the equation. The contribution of this value towards the total is given on the right. Parity is responsible for the shift of 1.

Worked Example of Coding Insignificant Bits, for Value 85 (1010101)

1. Just 7 LSBs 1010101
2. Secondary significance
   - Significance = 1, GT1 = 1, GT2 = 1, Parity = 1, Code 40 as rice
   - Significance = 1, GT1 = 1, Parity = 1, Code 41 as rice
     • Not using GT2 to keep total flags (including first significance at 4)
3. Offset secondary significance (m = 2)
   - Significance (>32) = 1, GT1 (>64) = 1, Parity (& 100000) = 0, Code 5 lowest LSBs 10101
     • This formulation only requires GT1 to be signalled if significance is 1, parity is signalled only if both significance and GT1 are 1
   - GT1 (>64) = 1, Parity (& 100000) = 0, Code 5 lowest LSBs 10101
     • This formulation requires both flags to be signalled
       - Basically using CABAC context bins to encode top two LSBs
4. Offset secondary significance (m = 1)
   - Significance (>64) = 1, Code 6 lowest LSBs 010101
     • Basically using CABAC context bin to encode top LSB Summary Apparatus The apparatus of FIG. 12, operating in accordance with the techniques described here, and for example in association with FIGS. 7 and 8, provides an example of apparatus for encoding successive data items, the apparatus comprising:

encoding circuitry 1210, 1240, 1230 configured to encode a given data item using a series of one or more data sets, each data set representing a respective range of values of the data items; the series of one or more data sets comprising at least a significance indicator to indicate whether or not the given data item has a value of at least a first threshold value; and control circuitry 343, 1250 configured, for at least some of the data items, to select the first threshold value to be greater than 1.

The apparatus of FIG. 13, operating in accordance with the techniques described here, and for example in association with FIGS. 7 and 8, provides an example of apparatus for decoding an input data signal representing successive data items, the apparatus comprising:

decoding circuitry 1300, 1310, 1320 configured to decode a given data item using a series of one or more data sets, each data set representing a respective range of values of the data items; the series of one or more data sets comprising at least a significance indicator to indicate whether or not the given data item has a value of at least a first threshold value; and control circuitry 343, 1340 configured, for at least some of the data items, to select the first threshold value to be greater than 1.

Note that in example arrangements the significance indicator mentioned above may be a first flag in a potential succession of flags (significance, GT1, GT2 and the like). A further significance flag may also be used as discussed here.

It is noted that although FIGS. 12 and 13 refer to the encoding circuitry and the decoding circuitry as two respective units in each case, the first and second circuitries in each instance could be implemented as a single common circuitry having both respective functions.

As discussed above, it will be noted that any of these apparatuses may be implemented as video data capture, transmission, display and/or storage apparatus comprising such apparatus.

Summary Methods

Figure 25:
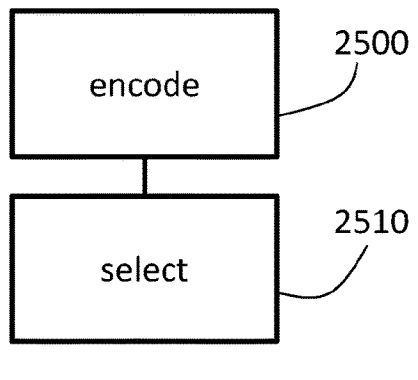

FIG. 25 is a schematic flowchart illustrating a method of encoding successive data items, the method comprising:

encoding (at a step 2500) a given data item using a series of one or more data sets, each data set representing a respective range of values of the data items; the series of one or more data sets comprising at least a significance indicator to indicate whether or not the given data item has a value of at least a first threshold value; and for at least some of the data items, selecting (at a step 2510) the first threshold value to be greater than 1.

Figure 26:
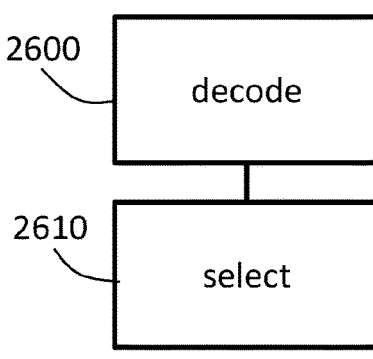

FIG. 26 is a schematic flowchart illustrating a method of decoding successive data items, the method comprising:

decoding (at a step 2600) a given data item using a series of one or more data sets, each data set representing a respective range of values of the data items; the series of one or more data sets comprising at least a significance indicator to indicate whether or not the given data item has a value of at least a first threshold value; and for at least some of the data items, selecting (at a step 2610) the first threshold value to be greater than 1.

Any one or more of the above encoding techniques may be implemented by the apparatus of FIGS. 7 and/or 8 and/or 12.

Any one or more of the above decoding techniques may be implemented by the apparatus of FIGS. 7 and/or 8 and/or 13.

Further Examples Relating to the Step 2200
(Generation of n at the Encoder Side for Signalling to the Decoder)

Further examples will now be described which can be used for the generation of the parameter n as described above but which may also have other, different, uses in addition to this use or in place of this use.

Figures 27, 28, 29:
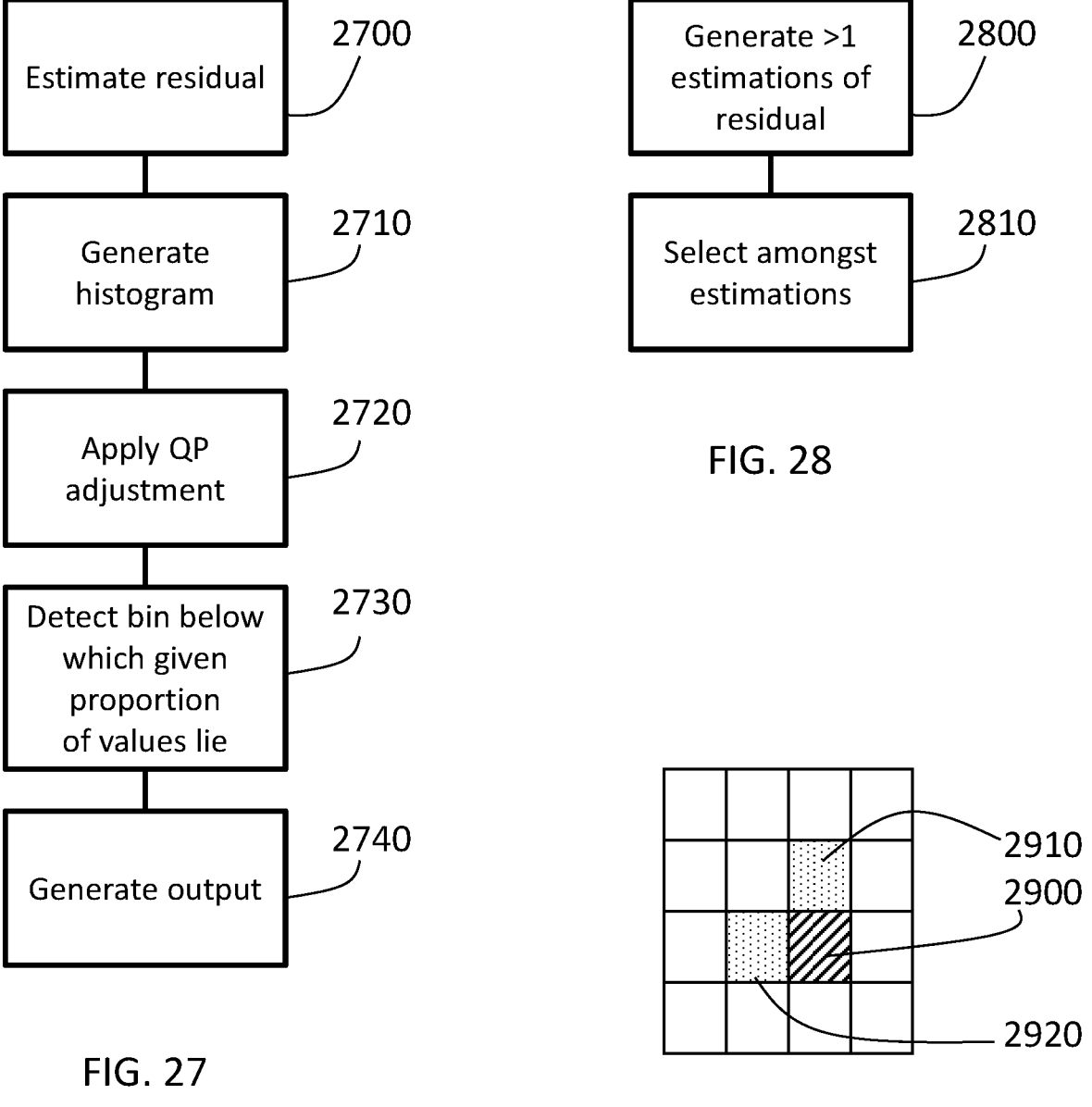

FIG. 27 is a schematic flowchart representing an overview of a technique which can be performed at the encoder side for example for any one or more of the following purposes (or indeed for other purposes):

Generation of n as discussed above;

Generation of a parameter for use in other aspects of encoding such as in so-called "transform skip residual coding" (TSRC) to be described below;

Detection of a preferred scan direction for use in deriving parameters such as a so-called "last x,y" parameter;

Generation of a parameter (for example, for signaling to the decoder side) to indicate whether such a so-called "last x,y" parameter is signaled.

The technique is based around generating an estimate of one or more aspects of the residual data to be encoded (in the full encoding process, this is the difference 330 between the input image and the prediction of the input image). For the purposes of the present analysis, a step 2700 comprises generating a relatively simple estimate of the residual data 330 without necessarily requiring the more complicated and time-consuming generation of particular image predictions such as inter-image and intra-image predictions of the form used for the full encoding.

For example, the steps of FIG. 27 may be performed in respect of a picture, prior to full encoding of that picture, so that in this example the step 2200 would be performed once per picture and the step 2210 may involve signalling the derived value of n (and/or other information obtained using this technique as mentioned above) once per picture, for example in a picture header and/or picture parameters set. However, it will be appreciated that the step 2200 (in other words, the technique of FIG. 27) can be performed more or less frequently than this and the signalling at the step 2210 may then be performed such that the decoder is provided with a prevailing appropriate value of n (and/or other parameter(s) discussed above) for use in decoding of the encoded image data. This provides an example performing the generating and communicating steps once in respect of an image or image portion to be encoded, in which set of the image data samples comprises at least some of the image data samples of that image or image portion to be encoded.

Instead, an estimated predicted value for a sample 2900 (FIG. 29) may be taken to be a sample value 2910 above the sample 2900 or a sample value 2920 to the left of the sample 2900.

In some examples of the step 2700, one of these sample values 2910, 2920 can be selected on a predetermined basis and used as the prediction so that the estimate of residual data corresponding to the sample 2900 is:

$$residual = abs(value - pred)$$

Here, "value" represents the sample 2900, "pred" represents the selected sample used for the estimate of the prediction and the function "abs" denotes the absolute value.

This provides an example of comparing the given image data sample with another image data sample at a predetermined image location relative to the given image data sample and deriving the estimate of the residual data for the given image data sample in dependence upon a difference between the given image data sample and the other image data sample.

In another example of the step 2700, the prediction pred could be taken to be the mean of two or more samples having, for example, a predetermined spatial relationship to the sample 2900, for example as:

$$pred=mean (value of 2910, value of 2920)$$

The set of sample values which are averaged to generate pred could include more than two sample values. The averaging process could be a weighted average so that, for example, the values of the samples 2910, 2920 are weighted more heavily than values of other samples which are spatially further away from the sample 2910. The samples upon which the generation of pred is based could be displaced in any direction from the sample 2900 but in example arrangements they are displaced above and/or to the left of the sample 2900. In the case that any such sample is missing, for example because the location of the sample 2900 is adjacent one or more image edges, the prediction pred could be based upon one or more samples which are in fact present. In other examples, values of the estimated prediction pred could be generated for positions of the sample 2900 other than positions in the top row and/or leftmost column of samples.

This provides an example of comparing the given image data sample with a value derived as a predetermined combination of two or more other image data samples at predetermined respective image locations relative to the given image data sample and deriving the estimate of the residual data for the given image data sample in dependence upon a difference between the given image data sample and the value derived as the predetermined combination.

In another example of the step 2700, multiple estimations could be generated (for example at a step 2800 of FIG. 28) and then the residual obtained by selecting amongst those estimations at a step 2810.

For example, for a set of predictions pred1 . . . predN, where N>1, the derivation could be as follows:

$$residual=min(abs(value-pred1),abs(value-pred2), . . .$$
$$abs(value-predN))$$

Here, "min" represents a minimum function.

This provides an example of comparing the given image data sample with two or more other image data samples at different, predetermined respective image locations relative to the given image data sample, and deriving the estimate of the residual data for the given image data sample in dependence upon a smallest respective difference between the given image data sample and the two or more other image data samples.

Referring back to FIG. 27, a next step 2710 involves generating a frequency distribution of the estimated residual values, for example a histogram representation. Note that although the word "histogram" can connote a graphical representation (and indeed graphical examples are provided in the discussion below), in the present context it refers to the generation of frequency distribution data rather than to any graphical presentation.

Figure 30:
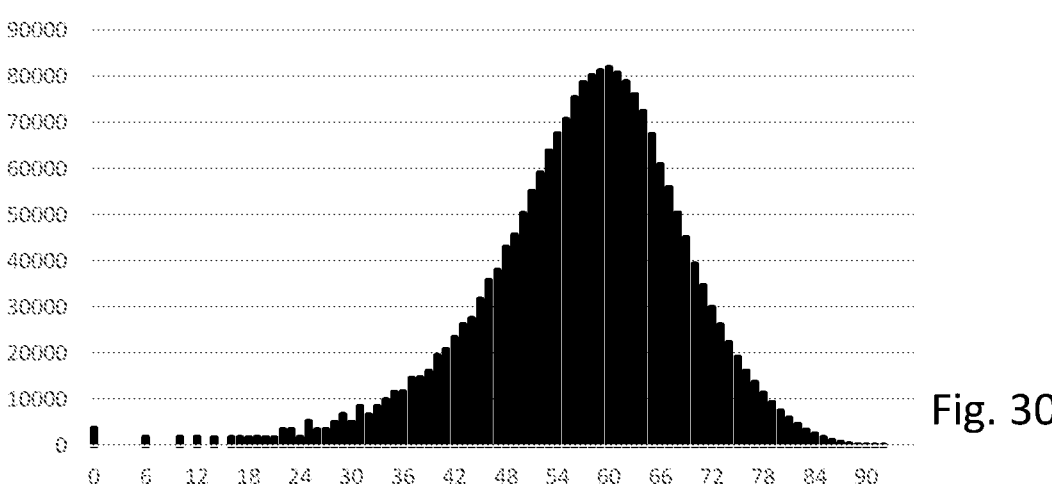
FIGS. 30 to 32 are example schematic histogram representations.

FIG. 30 provides a schematic example of such a histogram. Here, the vertical axis represents frequency of occurrence on an arbitrary scale (which will of course depend upon the number of samples in the image under consideration). The horizontal axis represents respective "bins" each indicative of a respective bin value representing the residual data derived for a sample using any of the techniques described above.

In order to populate the bins, the following example process may be performed:

$$bin=log 2(residual)*6$$

Here, log 2 signifies a logarithm to the base two.

The multiplication by 6 is applied to allow for the feature of many encoding systems (such as the so-called Versatile Video Coding system) that a QP (quantisation parameter) change of 6 is indicative of a quantisation step of 2 in this example. There are other cases where there may be a different scheme of mapping QP. It is therefore in effect a scaling operation as between the numerical residual data and the QP adjustment process discussed below. It could equivalently be performed by not applying the multiplication and division by 6 at the stages shown, but instead dividing the "adjustment" value derived below by 6. The multiplication by 6 is reversed later by a division by 6.

The histogram of FIG. 30 is labelled "No QP adjustment" as a notional indication that it represents the data generated at the step 2710 before a step 2720 to be described below at which a process of "QP adjustment" is applied.

Referring to the step 2720, a QP adjustment process is provided. This makes use of quantisation parameter (QP) information, in particular a so-called baseQP which depends upon the bit depth (bitdepth in the expression below) of the image data under consideration and a sliceQP applicable to the image slice containing each of the samples 2900 (and which is derived before full encoding of the picture is performed). In an example:

$$baseQP=4-(bitdepth-8)*6$$

$$adjustment=sliceQP-baseQP$$

$$adjustedBin=max(0, initialBin-adjustment)$$

Here, "max" represents a maximum function,

The effect is to "move" the histogram to the left and accumulate values in the left hand zero bin of the histogram. The contents of bins are moved from initial bins (initialBin) to adjusted bins (adjustedBin), with the "max" function implying that the adjusted bin can be no lower than bin 0 or in other words the left-hand bin of the histogram as drawn. This process at least partially simulates, for the purposes of generating the estimate discussed here, the quantisation process which will be applied during full encoding.

Figure 31:
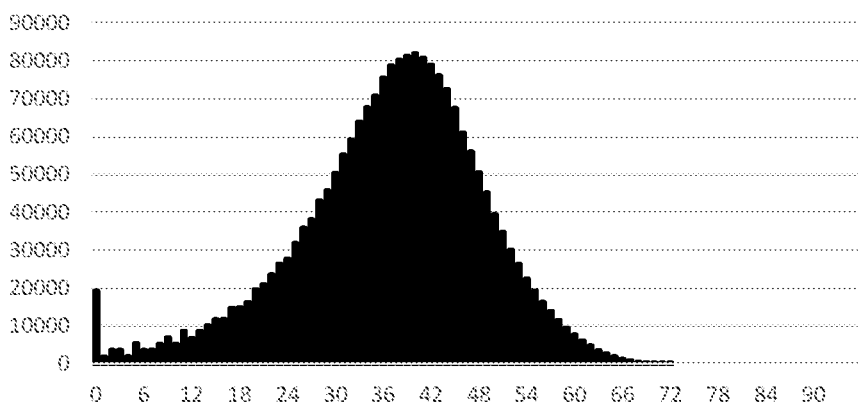
Figure 32:
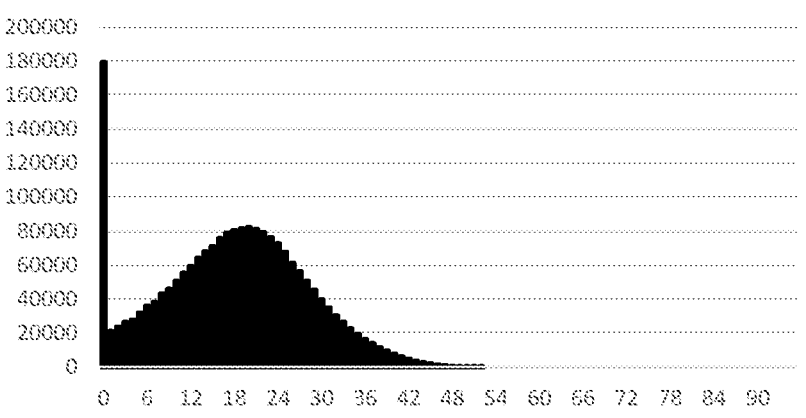

Examples of adjusted histograms are shown schematically in FIGS. 31 and 32. In the case of FIG. 31, the value "adjustment" is equal to 20. In the case of FIG. 32 (noting a different vertical scale) the value "adjustment" is equal to 40.

Referring back to FIG. 27, a step 2730 involves detecting a bin below which a given proportion of values lies. This process will be described in more detail with reference to FIGS. 33-36.

Figure 33:
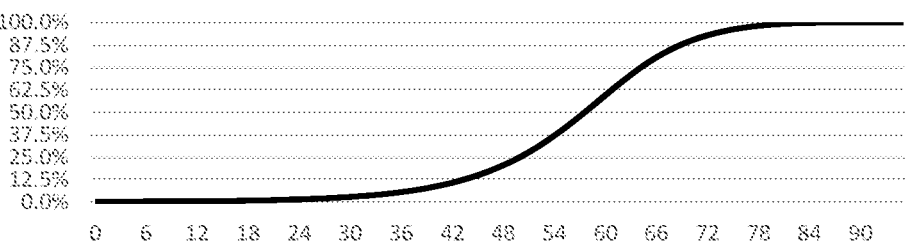
FIGS. 33 to 36 are schematic example cumulative frequency representations.
Figure 34:
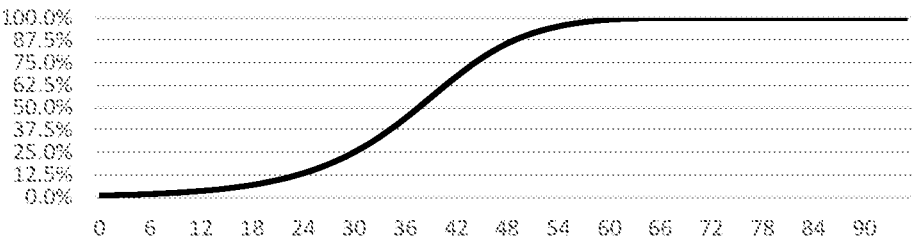
Figure 35:
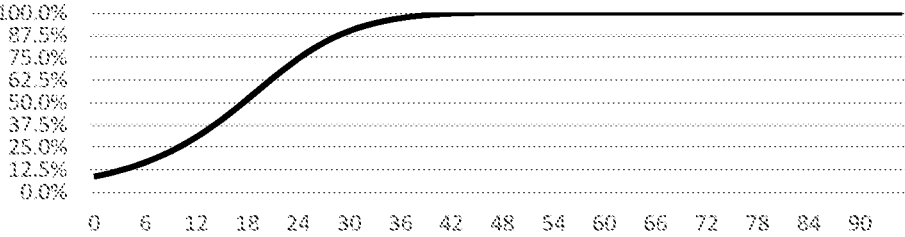
Figure 36:
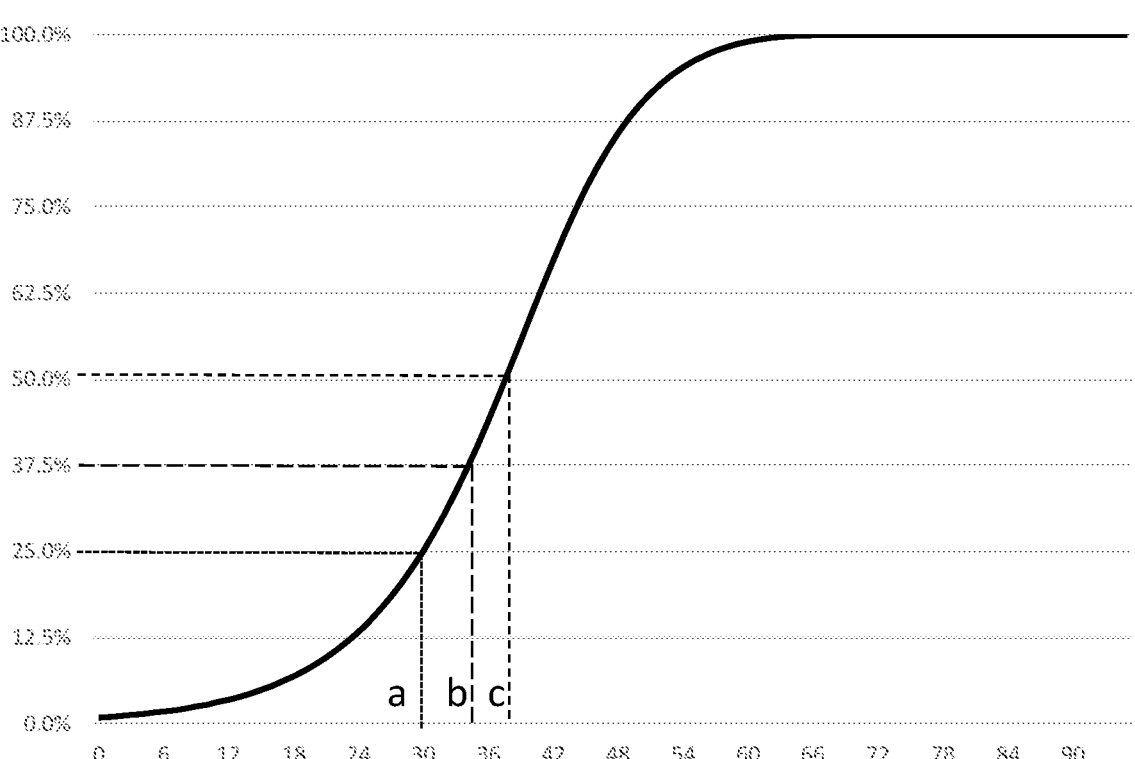

Each of FIGS. 33-35 represents a cumulative frequency chart. Again, this is simply a visual representation for the purposes of the description of an underlying technical process relating to the data as generated. Each cumulative frequency chart indicates, for the respective histograms of FIGS. 30-32, the percentile (vertical axis) associated with each bin value (horizontal axis).

In some examples, the step 2730 can involve the detection of a single bin, for example the bin at the centre point of 2nd quartile (37.5% percentile), and dividing the detected bin value by 6 to generate (at a step 2740) the value n as:

$$n=(\text{bin at 37.5\% percentile})/6$$

In other examples, and averaging process may be used in which:

$$n = ((a + 2b + c)/4)/6$$

Here:
a=bin at 25% percentile
b=bin at 37.5% percentile
c=bin at 50% percentile

Therefore, in these examples, a technique is provided for the generation of a value n, for example once per picture, for use in the encoding of samples of that picture and to be communicated, for example as part of the encoded data stream or by a separate side channel, to the decoding side for use in decoding of the corresponding encoded data.

The detection of percentiles discussed above (and indeed the step 2730) provide an example of detecting a value, with respect to the data indicative of the estimated residual data, the value being such that the data indicative of the estimated residual data lies below that value for a given proportion of the set of image data samples. The step of generating the cumulative frequency distribution may comprise applying an adjustment (for example at the step 2720) to the estimated residual data to generate the data indicative of the estimated residual data, the adjustment depending on at least a quantisation parameter applicable to the set of image data samples. The adjustment may depend (for example, via the baseQP) on at least a bit depth applicable to the set of image data samples.

The step 2740 provides an example of generating one or more encoding parameters comprises generating a cumulative frequency distribution of data indicative of the estimated residual data for the set of image data samples and deriving the one or more encoding parameters in dependence upon the cumulative frequency distribution.

Pseudocode Example

The following pseudocode example relates to the conversion of the histogram representation generated at the step 2710 into a cumulative frequency representation and the computation of the value n as discussed above:

```
targetB = (total * 3) / 8; // total is number of entries in histogram
targetA = targetB − total / 8;
targetC = targetB + total / 8;
a = −1;
b = −1;
current = 0;
for (i = 0; i < 128; i++) {
    current += hist[i] // hist is the histogram computed for the slice/frame
    if (current >= targetA && a == −1)    { a = i } // reached intercept a
    if (current >= targetB && b == −1)    { b = i } // reached intercept b
    if (current >= targetC) {                        // reached intercept c
        c = i
        n = (((a + 2 * b + c) / 4) / 6)
        break
    }
}
```

Variations

In some examples, the steps 2700-2720 can be combined into one loop handling one pixel at a time. In other examples the steps 2700-2710 can be combined and/or the adjustment of the step 2720 can instead be performed on the intercepts a, b and c.

Example—TSRC Parameters

TSRC techniques have been proposed, for example in JVET-T0089, "AHG12: Slice based Rice parameter selection for transform skip residual coding", H.-J. Jhu, X. Xiu, Y.-W. Chen, T.-C. Ma, C.-W. Kuo, X. Wang (Kwai Inc.), the contents of which are hereby incorporated by reference, in which the encoder side generates and signals an offset value to be applied to a Rice parameter for use in so-called Rice coding, for example, Golomb-Rice and/or Exponential-Rice coding, of at least parts of coefficient values. In previously proposed examples, this offset is computed using the previously encoded frame. However, it is noted that such arrangements do not provide for the generation of such an offset in respect of a first frame or a still image and may potentially lead to the inappropriate or incorrect generation of an offset in respect of the first frame or after a significant change in image content between images or slices.

TSRC techniques can involve, for a p-bit image data sample:
  encoding a first portion of the image data sample by a first encoding technique; and
  encoding a second portion of the image data sample by a second encoding technique, in which the first encoding technique is different to the second encoding technique; in which at least one of the first and second encoding techniques is defined at least in part by the one or more encoding parameters.

For example at least one of the first and second encoding techniques may comprise Rice coding defined at least in part by a Rice parameter dependent upon the one or more encoding parameters as discussed below.

In the case of TSRC, the encoding may comprise selectively applying a frequency transform or applying a transform skip process; and the image data samples to which TSRC applies are image data samples to which the transform skip process has been applied.

In the present examples, techniques related to those discussed above may be used to generate an offset value in respect of each frame by processing the data of that frame using the steps of FIG. 27.

Figure 37A:
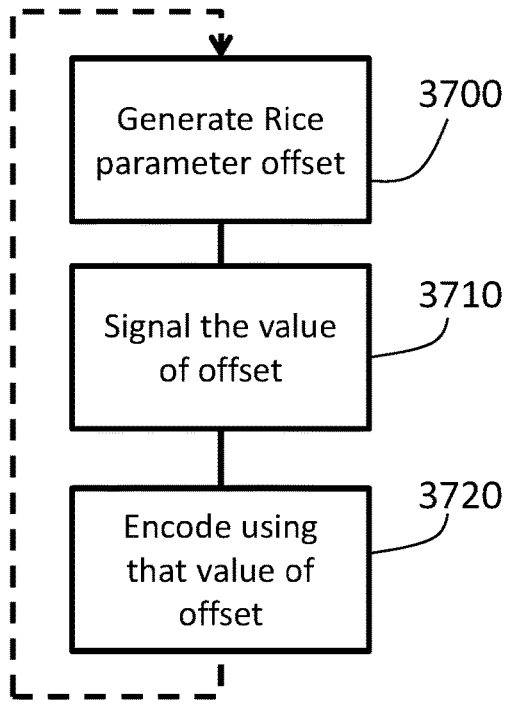
FIGS. 37a and 37b are schematic flowcharts illustrating respective methods.

FIG. 37*a* provides a schematic overview of such a process at the encoder side, in which a value of a Rice parameter offset is generated at a step 3700, the value of the Rice parameter offset (or a representation of it) is signalled, for example in a picture header or parameter set at a step 3710 and one or more coefficient values (for example those representing a whole picture) are encoded at a step 3720 using the generated value of n, before control returns to the step 3700 where a next value of the Rice parameter offset is generated.

Figure 37B:
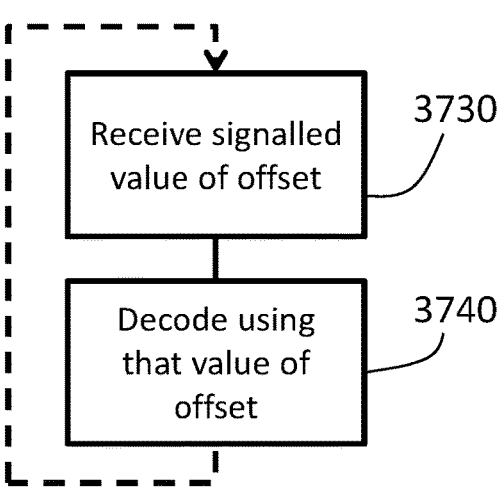

In FIG. 37*b*, the equivalent process at the decoder side is shown in which, at a step 3730, the decoder receives a signalled value of the Rice parameter offset (as provided at the step 3710) and at a step 3740 decodes one or more coefficient values (for example those representing a whole picture) before returning control to the step 3730.

The Rice parameter offset ("offset") can be generated at the step 3700 as follows:
  offset=bin at X % percentile, for example a given percentile, for example the 75th percentile—the reasoning being in this example that if it is assumed that the smallest 50% of values are coded with flags, this would represent the midpoint of the remaining values. Note that this may be a different percentile value to that discussed in connection with the generation of n because of the nature of the use of Rice coding (Rice coding is used for the remainder of a value (once significance, GT1, GT2 have been used for an initial part)). Here the offset represents an output derived at the step 2740 described above.

Variation in Expression for Bin Selection

Instead of the expression "bin=log 2(residual)*6" discussed above, the following can be used:

$$bin = \log2(\max(1, residual - m)).$$

Here, m is a further offset to allow for the use of flags such as significance, GT1, GT2 for example, to encode an initial part of each value.

Example—Last Significant Coefficient Position—Direction

An example will now be described in which the prediction of the residual described above may be used to determine an encoding direction for the encoding of the last significant coefficient position (colloquially known as "last x, y" position) for a transform block.

Figure 38:
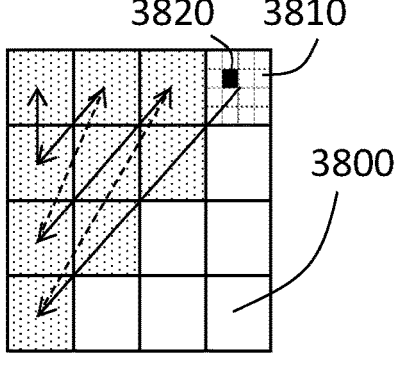
FIGS. 38 and 39 schematically illustrate an aspect of transform block encoding.
Figure 39:
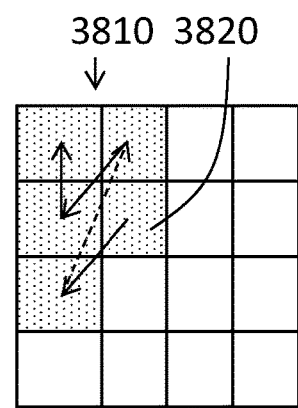

FIGS. 38 and 39 schematically illustrate a scan process. In FIG. 38, an example 16×16 coefficient transform block has been split into 16 sub-blocks 3800 of 4×4 coefficients. A reverse diagonal scan pattern is used for the processing of the sub-blocks of the transform block.

For each transform block a syntax element (a coded block pattern) is encoded to indicate whether the transform block contains any non-zero transform coefficient levels. If this is encoded to indicate "yes" then the position of the first non-zero level in the scan order (also referred to as the last significant coefficient position) is encoded. Processing according to the reverse diagonal scan pattern commences with the coefficient identified by the last significant coefficient position.

In FIG. 38, the coded block pattern for the 16×16 transform block is encoded to indicate that the transform block contains one or more non-zero transform coefficient levels. A sub-block 3810 contains the coefficient 3820 which is flagged as the last significant coefficient position. Processing of the transform block commences (in the reverse diagonal scan order) with the sub-block 3810 and, as shown by an expanded view of the sub-block 3810 in FIG. 39, within the sub-block 3810 processing commences in the reverse diagonal scan order with the coefficient position 3820.

When encoding the last significant coefficient position, in common with many other aspects of encoding within this type of system, it is considered "cheaper" (less onerous in terms of the resulting quantity of data which is generated for inclusion in or with the encoded data stream) to encode smaller rather than larger values. In connection with the encoding of the coefficient position 3820, smaller values can be expected in situations where the coefficient position 3820 is generally closer to the origin from which the x, y coordinates defining that position are derived.

In general terms, two options are considered here, namely that the origin for these purposes is taken to be (i) the top left coefficient position or (ii) the bottom right coefficient position. In prevailing examples of the so-called Versatile Video Coding standards at the priority date of the present application, the coding is performed from an origin at the top left coefficient position.

The techniques described above for estimating the residual can provide for an adaptive alteration of the location of the origin for the derivation of the last significant coefficient position according to aspects of the data obtained with reference to FIG. 27.

In some examples, a fraction or proportion of "smaller" numbers (or zero) to "larger" numbers in the residual data can be used to estimate how "full" (that is to say, how occupied by non-zero coefficient data) the blocks are.

An example of this calculation with respect to the set of estimated residual values derived at the step 2700 is as follows:

$$Fraction = [occupancy\ of\ bins\ 0\ to\ p]/[occupancy\ of\ bins > p]$$

(where p is a small value such as 0, 6, 12 or the like)

As an alternative, the denominator could be "[occupancy of all bins]".

An example of this calculation with respect to the processed cumulative frequencies at the step 2730 (and therefore representing an example of the derivation of an output at the step 2740) is as follows, where CF[bin]=cumulative frequency value associated with a given bin):

Fraction=CF[bin1], where bin1=0, or p (where p is a small value such as 6, 12 and p indicates the lowest bin in the histogram which implies a non-zero coefficient value).

If the fraction mentioned above is large (at or above a threshold Thr such as 0.5), this implies relatively full (or mostly full) blocks and that the origin location for last significant coefficient position coding should be reversed (that is to say, the origin should be located at the bottom right).

If the fraction mentioned above is small (for example smaller than to the threshold Thr), this implies relatively empty blocks and that the origin location for last significant coefficient position coding should be maintained as the top left (as standard in VVC v1).

It will be noted that the partitioning of a data set by a threshold in this context can be expressed such that a value equal to the threshold is included in the "over" or "under" threshold groups. That is to say that such partitioning can be expressed as:

Set 1: $< Thr1$; Set 2: $=> Thr1$ or

Set 1: $<= Thr2$; Set 2: $> Thr2$

It will be understood that these ways of expressing a threshold decision are technically equivalent and (subject potentially to a difference of one (or its equivalent) in the values Thr1, Thr2), can lead to the same outcome.

It will also be understood that different respective threshold values may be applicable in the case of the denominator being [occupancy of bins>p] and [occupancy of all bins].

In an example, i the threshold was 1 (with the divisor of the fraction or denominator being [occupancy of bins>p]) this would imply a threshold where 50% of coefficients would be expected to be non-zero. If the fraction was greater than the threshold, more than 50% of the values are likely to be non-zero and therefore the blocks are more likely to full.

FIG. 40*a* provides a schematic overview of such a process at the encoder side, in which a coding direction (an indication of a top left or a bottom right origin) is generated at a step 4000, the coding direction (or a representation of it) is signalled, for example in a picture header or parameter set at a step 4010 and one or more coefficient values (for example those representing a whole picture) are encoded at a step 4020 including, as at least a part of that process, the encoding of the last significant coefficient position for blocks to which this is relevant using the generated coding direction, before control returns to the step 4000 where a next instance of the coding direction is generated.

In FIG. 40*b*, the equivalent process at the decoder side is shown in which, at a step 4030, the decoder receives a signalled coding direction (as provided at the step 4010) and at a step 4040 decodes one or more coefficient values (for example those representing a whole picture) using that signalled coding direction before returning control to the step 4030.

Example—Last Significant Coefficient Position—Whether to Encode

As an optional aspect (in its own right or in addition to the direction encoding discussed above), the operations discussed above can be used to derive an indicator (which can then be coded in the data stream) as to whether the last significant coefficient position or last x, y should even be coded to the data stream. In particular, the arrangement may be that the last significant coefficient position is not coded if the threshold comparison discussed above (in any of the examples) indicates that the blocks are predicted to be mostly full. Note that if a block is not 100% full then the first few zero-value coefficients must be coded but if (on the average) there are sufficiently few of these this can be less costly in terms of quantity of encoded data than coding the last significant coefficient position. FIG. 41*a* provides a schematic overview of such a process at the encoder side, in which an indicator of whether to encode the last significant coefficient position is generated at a step 4100 using the techniques discussed above. The indicator (or a representation of it) is signalled, for example in a picture header or parameter set, at a step 4110. One or more coefficient values (for example those representing a whole picture) are encoded at a step 4120 this process selectively including, as at least a part of the process and if the indicator as generated by the step 4100 indicates that the last significant coefficient position is being coded, the encoding of the last significant coefficient position for blocks to which this is relevant, before control returns to the step 4100 where a next instance of the indicator is generated.

In FIG. 41*b*, the equivalent process at the decoder side is shown in which, at a step 4130, the decoder receives a signalled indicator as to whether coding direction (as provided at the step 4110) and at a step 4140 decodes one or more coefficient values (for example those representing a whole picture) using a signalled and decoded last x,y or last significant coefficient position before returning control to the step 4130. In the case that the indicator indicates that the last significant coefficient position is not coded, the step 4140 does not include decoding the last significant coefficient position (which is not present in the coded data stream) and comprises decoding the one or more coefficient values without the last significant coefficient position.

Last x,y Techniques—Summary

The last x,y techniques (either individually or collectively, as appropriate, noting that either or both of the techniques may be performed) provide examples in which the encoding comprises encoding the image data samples as a plurality of blocks and encoding, for a given block, data indicative of a location (such as last x, y) within that block of an image data sample having a predetermined property, in which the step of generating one or more encoding parameters comprises generating an origin indicator to indicate an origin to be used, with respect to the plurality of blocks, to generate the data indicative of the location within the blocks.

In examples, samples are processed within the blocks according to a predetermined processing order; and in which the data indicative of a location within that block of an image data sample having the predetermined property comprises data indicative of a location within that block of a first image data sample in the predetermined processing order having a value in a given range of values.

The origin indicator may be indicative of a top-left origin or a bottom-right origin.

As discussed above, the generating an origin indicator may comprise generating an occupancy prediction indicative of a prediction of a proportion of blocks having at least a threshold proportion of data values to be encoded in response to a distribution of values of the estimate of the residual data. For example the generating of an occupancy prediction may comprise detecting a proportion of the values of the estimate of the residual data having a value below a threshold value.

The techniques may also comprise determining whether or not the data indicative of a location within a block of an image data sample having a predetermined property should be encoded; and selectively encoding the data indicative of a location within a block of an image data sample having a predetermined property in response to the determination. For example, in response to the determination, an indicator may be generated and encoded to indicate whether or not the data indicative of a location within a block of an image data sample having a predetermined property is being encoded.

Further Summary Methods

FIG. 42 is a schematic flowchart illustrating a data encoding method comprising:

generating (at a step 4200) one or more encoding parameters;

communicating (at a step 4210) the one or more encoding parameters for use by a decoding process; and encoding (at a step 4220) data items representing image data samples of an image by generating residual data indicative of a difference between an image data sample and a predicted version of that image data sample, the encoding step performing the encoding in dependence upon the one or more encoding parameters generated by the generating step;

in which the generating step 4200 comprises deriving an estimate of the residual data in respect of at least a subset of the image data samples and generating the one or more encoding parameters in dependence upon the derived estimate.

This method may be performed by the apparatus described above, for example at least in part by the controller 343 (in respect of the steps 4200, 4210) and the encoding apparatus described with respect to FIG. 7 and other drawings (the step 4220).

FIG. 43 is a schematic flowchart illustrating a method of decoding successive image data samples, the method comprising:

decoding (at a step 4300) an indicator indicative of an aspect of the encoding, for a given block, data indicative of a location within that block of an image data sample having a predetermined property; and decoding (at a step 4310) the given block in response to the indicator.

This method may be performed by the apparatus described above, for example at least in part by the controller 343 (in respect of the steps 4300) and the decoding side of the apparatus described with respect to FIG. 7 and other drawings (the step 4310).

As an additional representation, however, FIGS. 44 and 45 schematically illustrate respective apparatus (again, which can also be implemented by the circuitry described above).

In particular, FIG. 44 schematically illustrates apparatus comprising:

parameter generator circuitry 4400 configured to generate one or more encoding parameters;

communication circuitry 4410 configured to communicate the one or more encoding parameters for use by a decoding process; and encoder circuitry 4420 configured to encode data items representing image data samples of an image by generating residual data indicative of a difference between an image data sample and a predicted version of that image data sample, the encoder circuitry being configured to perform the encoding in dependence upon the one or more encoding parameters generated by the parameter generator circuitry;

in which the parameter generator circuitry is configured to derive an estimate of the residual data in respect of at least a subset of the image data samples and to generate the one or more encoding parameters in dependence upon the derived estimate.

FIG. 45 schematically illustrates apparatus comprising:

decoder circuitry 4500 configured to decode an indicator indicative of an aspect of the encoding, for a given block, data indicative of a location within that block of an image data sample having a predetermined property; and to decode the given block in response to the indicator.

Combinations

It should be noted that any two or more of the uses of the process (or parts of it) of FIG. 27 may be combined, or in other words used simultaneously or in the same system or method. Indeed this can make the processing needed to perform parts of the process of FIG. 27 more worthwhile if multiple uses can be made of the results generated. If more than one use is made of the data, it may be possible not to communicate separate respective data indicative of the outcome of the process (for example, separate indications of two or more of n, Rice parameter and last x, y origin), but instead to communicate data from which the respective outcomes are derived at the decoder side.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Respective aspects and features are defined by the following numbered clauses:

1. A data encoding method comprising:

generating one or more encoding parameters;

communicating the one or more encoding parameters for use by a decoding process; and encoding data items representing image data samples of an image by generating, in a generating step, residual data indicative of a difference between an image data sample and a predicted version of that image data sample, the encoding step performing the encoding in dependence upon the one or more encoding parameters generated by the generating step;

in which the generating step comprises deriving an estimate of the residual data in respect of a set of the image data samples and generating the one or more encoding parameters in dependence upon the derived estimate.

2. The method of clause 1, in which the deriving step in respect of a given image data sample comprises comparing the given image data sample with another image data sample at a predetermined image location relative to the given image data sample and deriving the estimate of the residual data for the given image data sample in dependence upon a difference between the given image data sample and the other image data sample.

3. The method of clause 2, in which the deriving step comprises comparing the given image data sample with two or more other image data samples at different, predetermined respective image locations relative to the given image data sample, and deriving the estimate of the residual data for the given image data sample in dependence upon a smallest respective difference between the given image data sample and the two or more other image data samples.

4. The method of any one of the preceding clauses, in which the deriving step in respect of a given image data sample comprises comparing the given image data sample with a value derived as a predetermined combination of two or more other image data samples at predetermined respective image locations relative to the given image data sample and deriving the estimate of the residual data for the given image data sample in dependence upon a difference between the given image data sample and the value derived as the predetermined combination.

5. The method of any one of the preceding clauses, in which the step of generating one or more encoding parameters comprises generating a cumulative frequency distribution of data indicative of the estimated residual data for the set of image data samples and deriving the one or more encoding parameters in dependence upon the cumulative frequency distribution.

6. The method of clause 5, in which the step of generating one or more encoding parameters comprises detecting a value, with respect to the data indicative of the estimated residual data, the value being such that the data indicative of the estimated residual data lies below that value for a given proportion of the set of image data samples.

7. The method of clause 5 or clause 6, in which the step of generating the cumulative frequency distribution comprises applying an adjustment to the estimated residual data to generate the data indicative of the estimated residual data, the adjustment depending on at least a quantisation parameter applicable to the set of image data samples.

8. The method of clause 7, in which the adjustment depends on at least a bit depth applicable to the set of image data samples.

9. The method of any one of the preceding clauses, in which the encoding step comprises:

encoding a given image data sample using a series of one or more data sets, each data set representing a respective range of values of the image data samples; the series of one or more data sets comprising at least a significance indicator to indicate whether or not the given image data sample has a value of at least a first threshold value; and for at least some of the image data samples, selecting the first threshold value to be greater than 1;

in which the one or more encoding parameters are indicative of at least the first threshold value.

10. The method of clause 9, in which the one or more data sets comprise:

a significance data set comprising the significance indicator;

and zero or more further data sets selected from the list consisting of:

one or more greater-than-m data sets indicating whether a given image data sample is greater than a respective value of m, m being greater than the first threshold value; and a parity data set indicating a value of a least significant bit of a image data sample.

11. The method of clause 10, in which the threshold value is an integer equal to $2^n$ where n is an integer of zero or more.

12. The method of clause 11, in which the image data samples are multi-bit data words.

13. The method of clause 12, in which, for a p-bit image data sample for which n is greater than zero, the method comprises:

encoding a first portion of the image data sample represented by the most significant (p-n) bits by a second encoding technique; and encoding a second portion of the image data sample represented by the least significant n bits by a first encoding technique.

14. The method of clause 13, in which the first encoding technique is different to the second encoding technique.

15. The method of clause 14, in which the first encoding technique comprises encoding at least some of the least significant n bits by equiprobable binary arithmetic coding.

16. The method of clause 15, in which the first encoding technique comprises generating a second significance indicator in respect of a second threshold value lower than the first threshold value.

17. The method of any one of clauses 13 to 16, in which the second encoding technique comprises generating one or more of the further data sets.

18. The method of clause 17, in which the second encoding technique comprises, for any excess value of the given image data sample, the excess value being an amount by which the given image data sample exceeds a maximum value which can be encoded by the significance data set and the one or more further data sets, encoding the excess value as an escape code comprising a first portion and a non-unary coded second portion having a length, in bits, dependent upon a second portion size.

19. The method of any one of clauses 9 to 18, in which the significance indicator is configured to indicate whether or not an absolute value of the given image data sample has a value of at least the first threshold value.

20. The method of any one of the preceding clauses, in which the encoding step comprises, for a p-bit image data sample:

encoding a first portion of the image data sample by a first encoding technique; and encoding a second portion of the image data sample by a second encoding technique, in which the first encoding technique is different to the second encoding technique;

in which at least one of the first and second encoding techniques is defined at least in part by the one or more encoding parameters.

21. The method of clause 20, in which at least one of the first and second encoding techniques comprises Rice coding defined at least in part by a Rice parameter dependent upon the one or more encoding parameters.

22. The method of clause 21, in which the encoding step comprises selectively applying a frequency transform or applying a transform skip process; and the image data samples are image data samples to which the transform skip process has been applied.

23. The method of any one of the preceding clauses, in which the encoding step comprises encoding the image data samples as a plurality of blocks and encoding, for a given block, data indicative of a location within that block of an image data sample having a predetermined property, in which the step of generating one or more encoding parameters comprises generating an origin indicator to indicate an origin to be used, with respect to the plurality of blocks, to generate the data indicative of the location within the blocks.

24. The method of clause 23, in which the encoding step comprises processing samples within the blocks according to a predetermined processing order; and in which the data indicative of a location within that block of an image data sample having the predetermined property comprises data indicative of a location within that block of a first image data sample in the predetermined processing order having a value in a given range of values.

25. The method of clause 23 or clause 24, in which the origin indicator is indicative of a top-left origin or a bottom-right origin.

26. The method of any one of clauses 23 to 25, in which the step of generating an origin indicator comprises:
generating an occupancy prediction indicative of a prediction of a proportion of blocks having at least a threshold proportion of data values to be encoded in response to a distribution of values of the estimate of the residual data.

27. The method of clause 26, in which the step of generating an occupancy prediction comprises detecting a proportion of the values of the estimate of the residual data having a value below a threshold value.

28. The method of any one of clauses 23 to 26, comprising determining whether or not the data indicative of a location within a block of an image data sample having a predetermined property should be encoded;
the method comprising selectively encoding the data indicative of a location within a block of an image data sample having a predetermined property in response to the determination.

29. The method of clause 28, comprising the step, in response to the determination, of generating and encoding an indicator to indicate whether or not the data indicative of a location within a block of an image data sample having a predetermined property is being encoded.

30. The method of any one of the preceding clauses, in which the encoding step comprises encoding the image data samples as a plurality of blocks and selectively encoding, for a given block, data indicative of a location within that block of an image data sample having a predetermined property, the method comprising determining whether or not the data indicative of a location within a block of an image data sample having a predetermined property should be encoded.

31. The method of clause 30, comprising the step, in response to the determination, of generating and encoding an indicator to indicate whether or not the data indicative of a location within a block of an image data sample having a predetermined property is being encoded.

32. The method of any one of the preceding clauses, comprising performing the generating and communicating steps once in respect of an image or image portion to be encoded, in which set of the image data samples comprises at least some of the image data samples of that image or image portion to be encoded.

33. Computer software which, when executed by a computer, causes the computer to perform the method of any one of the preceding clauses.

34. A non-transitory machine-readable storage medium which stores the computer software of clause 33.

35. An encoded data signal generated by the method of any one of clauses 1 to 32.

36. A non-transitory machine-readable storage medium which stores the encoded data signal of clause 35.

37. Apparatus comprising:
parameter generator circuitry configured to generate one or more encoding parameters;
communication circuitry configured to communicate the one or more encoding parameters for use by a decoding process; and
encoder circuitry configured to encode data items representing image data samples of an image by generating residual data indicative of a difference between an image data sample and a predicted version of that image data sample, the encoder circuitry being configured to perform the encoding in dependence upon the one or more encoding parameters generated by the parameter generator circuitry;
in which the parameter generator circuitry is configured to derive an estimate of the residual data in respect of at least a subset of the image data samples and to generate the one or more encoding parameters in dependence upon the derived estimate.

38. Video data capture, transmission, display and/or storage apparatus comprising the apparatus of clause 37.

39. A method of decoding image data comprising detecting one or more encoding parameters in one or more pictures and using the one or more encoding parameters to decode compressed data, the encoding parameters having been created by computer software stored by the non-transitory machine-readable storage medium of clause 34.

40. Apparatus comprising:
decoder circuitry configured to decode image data; and
decoder circuitry comprising detector circuitry configured to detect one or more encoding parameters associated with compressed data representing one or more pictures;
the decoder circuitry being configured to decode the compressed data using the one or more encoding parameters, the encoding parameters having been created by the apparatus of clause 37.

41. A method of decoding successive image data samples, the method comprising:
decoding an indicator indicative of an aspect of the encoding, for a given block, data indicative of a location within that block of an image data sample having a predetermined property; and
decoding the given block in response to the indicator.

42. The method of clause 41, in which the indicator is indicative of one or both of:
an origin to be used, with respect to the plurality of blocks, to decode the data indicative of the location within the blocks; and
whether or not the data indicative of a location within a block of an image data sample having a predetermined property is encoded.

43. Computer software which, when executed by a computer, causes the computer to perform the method of clause 41.

44. A non-transitory machine-readable storage medium which stores the computer software of clause 43.

45. Apparatus comprising:
decoder circuitry configured to decode an indicator indicative of an aspect of the encoding, for a given block, data indicative of a location within that block of an image data sample having a predetermined property; and to decode the given block in response to the indicator.

46. Video data capture, transmission, display and/or storage apparatus comprising the apparatus of clause 40 or clause 45.

The invention claimed is:

1. A data encoding method comprising:

generating one or more encoding parameters;

communicating the one or more encoding parameters for use by a decoding process; and encoding data items representing image data samples of an image by generating residual data indicative of a difference between an image data sample and a predicted version of that image data sample, the encoding step performing the encoding in dependence upon the one or more encoding parameters generated by the generating step, wherein the generating step comprises deriving an estimate of the residual data in respect of a set of the image data samples and generating the one or more encoding parameters in dependence upon the estimated residual data, the generating step comprises generating a cumulative frequency distribution of data indicative of the estimated residual data for the set of the image data samples and deriving the one or more encoding parameters in dependence upon the cumulative frequency distribution, and the generating the cumulative frequency distribution comprises applying an adjustment to the estimated residual data to generate the data indicative of the estimated residual data, the adjustment depending on at least a quantisation parameter applicable to the set of the image data samples.

2. The method of claim 1, wherein the deriving, in respect of a given image data sample, comprises:

comparing the given image data sample with another image data sample at a predetermined image location relative to the given image data sample, and deriving the estimate of the residual data for the given image data sample in dependence upon a difference between the given image data sample and the other image data sample.

3. The method of claim 2, wherein the deriving step comprises:

comparing the given image data sample with two or more other image data samples at different, predetermined respective image locations relative to the given image data sample, and deriving the estimate of the residual data for the given image data sample in dependence upon a smallest respective difference between the given image data sample and the two or more other image data samples.

4. The method of claim 1, wherein the deriving, in respect of a given image data sample, comprises:

comparing the given image data sample with a value derived as a predetermined combination of two or more other image data samples at predetermined respective image locations relative to the given image data sample, and deriving the estimate of the residual data for the given image data sample in dependence upon a difference between the given image data sample and the value derived as the predetermined combination.

5. The method of claim 1, wherein the generating step comprises detecting a value, with respect to the data indicative of the estimated residual data, the value being such that the data indicative of the estimated residual data lies below that value for a given proportion of the set of image data samples.

6. The method of claim 1, wherein the adjustment depends on at least a bit depth applicable to the set of image data samples.

7. The method of claim 1, wherein the encoding step comprises:

encoding a given image data sample using a series of one or more data sets, each data set representing a respective range of values of the image data samples, the series of one or more data sets comprising at least a significance indicator to indicate whether or not the given image data sample has a value of at least a first threshold value; and for at least some of the image data samples, selecting the first threshold value to be greater than 1, and the one or more encoding parameters are indicative of at least the first threshold value.

8. The method of claim 7, wherein the one or more data sets comprise:

a significance data set comprising the significance indicator; and zero or more further data sets selected from the list consisting of:

one or more greater-than-m data sets indicating whether a given image data sample is greater than a respective value of m, m being greater than the first threshold value; and a parity data set indicating a value of a least significant bit of an image data sample.

9. The method of claim 1, wherein the encoding step comprises, for a p-bit image data sample:

encoding a first portion of the image data sample by a first encoding technique; and encoding a second portion of the image data sample by a second encoding technique, the first encoding technique is different to the second encoding technique, and at least one of the first and second encoding techniques is defined at least in part by the one or more encoding parameters.

10. The method of claim 9, wherein at least one of the first and second encoding techniques comprises Rice coding defined at least in part by a Rice parameter dependent upon the one or more encoding parameters.

11. The method of claim 10, wherein the encoding step comprises selectively applying a frequency transform or applying a transform skip process, and the image data samples are image data samples to which the transform skip process has been applied.

12. The method of claim 1, wherein the encoding step comprises encoding the image data samples as a plurality of blocks and encoding, for a given block, data indicative of a location within that block of an image data sample having a predetermined property, and the generating step comprises generating an origin indicator to indicate an origin to be used, with respect to the plurality of blocks, to generate the data indicative of the location within the blocks.

13. The method of claim 12, wherein the encoding step comprises processing samples within the blocks according to a predetermined processing order, and;

the data indicative of a location within that block of an image data sample having the predetermined property comprises data indicative of a location within that block of a first image data sample in the predetermined processing order having a value in a given range of values.

14. The method of claim 12, wherein the origin indicator is indicative of a top-left origin or a bottom-right origin.

15. The method of claim 12, wherein the generating the origin indicator comprises:

generating an occupancy prediction indicative of a prediction of a proportion of blocks having at least a threshold proportion of data values to be encoded in response to a distribution of values of the estimate of the residual data.

16. A non-transitory machine-readable storage medium which stores computer software which, when executed by a computer, causes the computer to perform a method, the method comprising:

generating one or more encoding parameters;

communicating the one or more encoding parameters for use by a decoding process; and encoding data items representing image data samples of an image by generating residual data indicative of a difference between an image data sample and a predicted version of that image data sample, the encoding step performing the encoding in dependence upon the one or more encoding parameters generated by the generating step, wherein the generating step comprises deriving an estimate of the residual data in respect of a set of the image data samples and generating the one or more encoding parameters in dependence upon the estimated residual data, the generating step comprises generating a cumulative frequency distribution of data indicative of the estimated residual data for the set of the image data samples and deriving the one or more encoding parameters in dependence upon the cumulative frequency distribution, and the generating the cumulative frequency distribution comprises applying an adjustment to the estimated residual data to generate the data indicative of the estimated residual data, the adjustment depending on at least a quantisation parameter applicable to the set of the image data samples.

17. An apparatus comprising:

parameter generator circuitry configured to generate one or more encoding parameters;

communication circuitry configured to communicate the one or more encoding parameters for use by a decoding process; and encoder circuitry configured to encode data items representing image data samples of an image by generating residual data indicative of a difference between an image data sample and a predicted version of that image data sample, the encoder circuitry being configured to perform the encoding in dependence upon the one or more encoding parameters generated by the parameter generator circuitry, wherein the parameter generator circuitry is configured to derive an estimate of the residual data in respect of at least a set of the image data samples and to generate the one or more encoding parameters in dependence upon the estimated residual data, the parameter generator circuitry is configured to generate a cumulative frequency distribution of data indicative of the estimated residual data for the set of the image data samples and deriving the one or more encoding parameters in dependence upon the cumulative frequency distribution, and the generating the cumulative frequency distribution comprises applying an adjustment to the estimated residual data to generate the data indicative of the estimated residual data, the adjustment depending on at least a quantisation parameter applicable to the set of the image data samples.

18. The apparatus of claim 17, wherein the apparatus is a video data capture apparatus, a transmission apparatus, a display apparatus, and/or a storage apparatus.

* * * * *